United States Patent
Christian et al.

(10) Patent No.: US 11,272,225 B2
(45) Date of Patent: Mar. 8, 2022

(54) WATERMARKING WITH PHASE SHIFTING

(71) Applicant: The Nielsen Company (US), LLC, New York, NY (US)

(72) Inventors: Timothy Christian, Oldsmar, FL (US); Rasha Rahaman, West Palm Beach, FL (US)

(73) Assignee: The Nielsen Company (US), LLC, New York, NY (US)

(*) Notice: Subject to any disclaimer, the term of this patent is extended or adjusted under 35 U.S.C. 154(b) by 58 days.

(21) Appl. No.: 16/713,486

(22) Filed: Dec. 13, 2019

(65) Prior Publication Data
US 2021/0183399 A1 Jun. 17, 2021

(51) Int. Cl.
H04N 21/233 (2011.01)
H04N 21/8358 (2011.01)
G10L 19/018 (2013.01)
H04N 21/2389 (2011.01)

(52) U.S. Cl.
CPC ....... *H04N 21/233* (2013.01); *H04N 21/8358* (2013.01); *G10L 19/018* (2013.01); *H04N 21/2335* (2013.01); *H04N 21/23892* (2013.01)

(58) Field of Classification Search
CPC ............. H04N 21/233; H04N 21/8358; H04N 21/23892; G10L 19/018
See application file for complete search history.

(56) References Cited

U.S. PATENT DOCUMENTS

| 6,233,347 | B1* | 5/2001 | Chen .................. H04H 20/31 382/100 |
| 7,131,007 | B1 | 10/2006 | Johnston et al. |
| 7,369,678 | B2 | 5/2008 | Rhoads |
| 2013/0216090 | A1 | 8/2013 | Zitzmann et al. |

(Continued)

FOREIGN PATENT DOCUMENTS

KR 20110047105 5/2011

OTHER PUBLICATIONS

Mowalee et al., "MATLAB Toolbox," Single Channel Phase-Aware Signal Processing in Speech Communication: Theory and Practice, First Edition, Dec. 2016, John Wiley & Sons, Ltd., 3 pages.

(Continued)

*Primary Examiner* — Asghar H Bilgrami
(74) *Attorney, Agent, or Firm* — Hanley, Flight & Zimmerman, LLC

(57) ABSTRACT

Apparatus, devices, systems, methods, and articles of manufacture are disclosed for watermarking with phase shifting. An example watermark decoding apparatus includes a component detector to identify watermark components in a media signal and detect phases of the respective ones of the watermark components in the media signal. The example apparatus also includes a phase reference determiner to identify a phase reference for the watermark components. The example apparatus also includes a phase comparator to perform comparisons of the phases of the respective ones of the watermark components with the phase reference. The example apparatus also includes a phase shift determiner to (Continued)

determine phase shifts associated with respective ones of the watermark components based on the comparisons. In addition, the example apparatus also includes a symbol determiner to determine a symbol based on the phase shifts.

20 Claims, 10 Drawing Sheets

(56) References Cited

U.S. PATENT DOCUMENTS

| | | | |
|---|---|---|---|
| 2014/0254801 A1* | 9/2014 | Srinivasan | G10L 19/018 381/17 |
| 2015/0340045 A1 | 11/2015 | Hardwick et al. | |
| 2018/0211673 A1 | 7/2018 | Sharma et al. | |
| 2018/0286417 A1 | 10/2018 | Hardwick et al. | |
| 2019/0295560 A1 | 9/2019 | Christian et al. | |
| 2019/0332840 A1* | 10/2019 | Sharma | G06K 7/1443 |
| 2020/0204817 A1* | 6/2020 | Topchy | H04N 19/467 |

OTHER PUBLICATIONS

Mowalee, "Introduction: Phase Processing, History," Single Channel Phase-Aware Signal Processing in Speech Communication: Theory and Practice, First Edition, Dec. 2016, John Wiley & Sons, Ltd., 31 pages.

Mowalee, "Fundamentals of Phase-Based Signal Processing," Single Channel Phase-Aware Signal Processing in Speech Communication: Theory and Practice, First Edition, Dec. 2016, John Wiley & Sons, Ltd., 38 pages.

Mowalee et al., "Phase Processing for Single-Channel Source Separation," Single Channel Phase-Aware Signal Processing in Speech Communication: Theory and Practice, First Edition, Dec. 2016, John Wiley & Sons, Ltd., 36 pages.

Mowalee, "Phase-Aware Speech Quality Estimation," Single Channel Phase-Aware Signal Processing in Speech Communication: Theory and Practice, First Edition, Dec. 2016, John Wiley & Sons, Ltd., 31 pages.

Mowalee, "Conclusion and Future Outlook," Single Channel Phase-Aware Signal Processing in Speech Communication: Theory and Practice, First Edition, Dec. 2016, John Wiley & Sons, Ltd., 10 pages.

Kulmer et al., "Phase Estimation Fundamentals," Single Channel Phase-Aware Signal Processing in Speech Communication: Theory and Practice, First Edition, Dec. 2016, John Wiley & Sons, Ltd., 41 pages.

Dong et al., "Data Hiding via Phase Manipulation of Audio Signals," IEEE Conference on Acoustics, Speech, and Signal Processing, Jun. 2004, 4 pages.

Walker, "R&D White Paper: Audio Watermarking," British Broadcasting Corporation, Aug. 2004, 17 pages.

Stahl et al., "Phase Processing for Single-Channel Speech Enhancement," Single Channel Phase-Aware Signal Processing in Speech Communication: Theory and Practice, First Edition, Dec. 2016, John Wiley & Sons, Ltd., 29 pages.

International Searching Authority, "International Search Report," mailed in connection with International Patent Application No. PCT/US2020/063769, dated Mar. 26, 2021, 4 pages.

International Searching Authority, "Written Opinion," mailed in connection with International Patent Application No. PCT/US2020/063769, dated Mar. 26, 2021, 7 pages.

* cited by examiner

| X | α | β | γ | Y | α' | β' | γ' | T | T | T | T |

WATERMARKING WITH PHASE SHIFTING

FIELD OF THE DISCLOSURE

This disclosure relates generally to media monitoring, and, more particularly, to watermarking with phase shifting.

BACKGROUND

Media, such as a television broadcast, may be encoded with watermarks that, when detected, are decoded to identify the media that was presented.

BRIEF DESCRIPTION OF THE DRAWINGS

The figures are not to scale. Also, in general, the same reference numbers will be used throughout the drawing(s) and accompanying written description to refer to the same or like parts.

DETAILED DESCRIPTION

Figure 1:
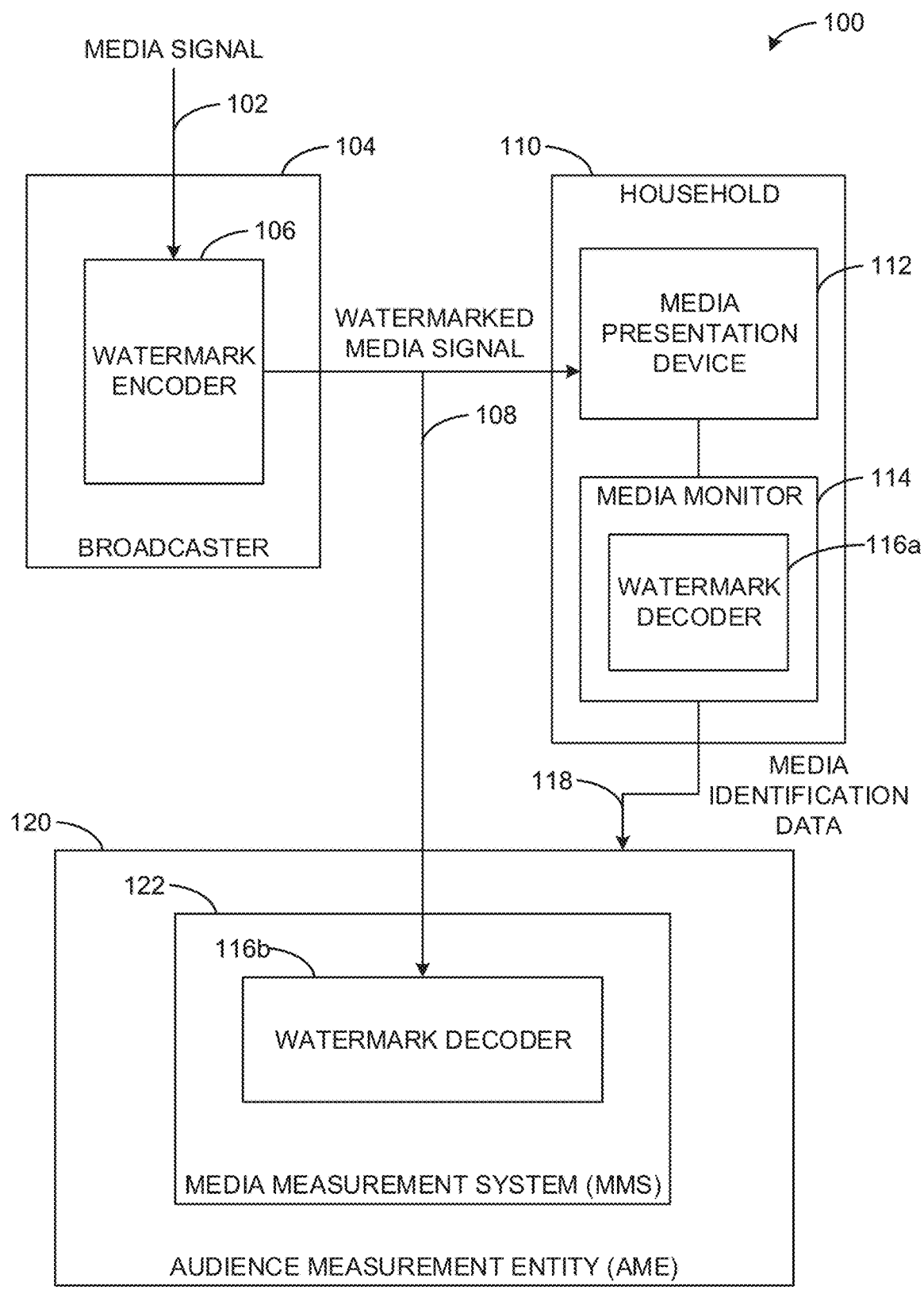
FIG. 1 is a block diagram of an example environment for watermarking with phase shifting.

Audience measurement entities desire knowledge on how users interact with media devices such as smartphones, tablets, laptops, smart televisions, etc. For example, media monitoring companies want to monitor media presentations made at the media devices to, among other things, monitor exposure to advertisements, determine advertisement effectiveness, determine user behavior, identify purchasing behavior associated with various demographics, etc.

Watermarking is a technique used to identify media such as television broadcasts, radio broadcasts, advertisements (television and/or radio), downloaded media, streaming media, prepackaged media, etc. Watermarking techniques identify media by embedding one or more codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Watermarks are encoded into media signals by selecting audio frequency ranges that have may have minimal influence on a user's or audience member's perception of the media signal (e.g., as determined empirically via psycho-acoustics) and modifying the media signal in this frequency range. Watermarks typically include a plurality of watermark components (e.g., symbols, tones, etc.). The watermark components are embedded in the media signal in a manner that is ideally imperceptible to a listener, but discernable when audio characteristics are analyzed during watermark decoding. One approach to audio watermarking is based on embedding short tones (e.g., sine waves) of particular frequencies and amplitudes, where the choice of tones is modulated by the watermark information payload. Specific tone frequency ranges and/or tone amplitude values can be associated with different values of watermark components. For example, an amplitude value satisfying a threshold may be observed at a tone frequency where a watermark component is expected. Based on the frequency range and amplitude value, a number (or other code representation) can be determined and utilized to determine identifying information per the watermark reference table(s).

However, many frequency ranges and/or amplitude values cannot be utilized to convey watermark components, as the result would be humanly perceptible and/or difficult to detect during decoding (e.g., due to a low signal-to-noise ratio). Therefore, the capacity of information that can be conveyed in watermark components by merely actuating amplitude values in frequency ranges is limited. In recent years, there is a demand to increase the information capacity of watermarks. For example, an increase in watermark capacity can support longer timestamps, telemetry of the encoder, and incorporation of flags to signal media monitors to begin, end, or modify decoding processes. This information is to be delivered substantially at the same time (e.g., within tenths of a second) as the existing information that is conveyed in watermarks to avoid elongating the overall watermark duration. Hence, there is a demand for not merely increasing the overall amount of information conveyed, but there is demand for increasing information density in watermark components.

Media signals can be characterized based on amplitude of the media signals and frequency values. Media signals can additionally be characterized based on a third property, phase. Phase refers to position at a time value of a media signal. In some examples, there may be a phase difference between watermark components embedded in a media signal. For example, watermark components can be embedded as sine waves with particular frequency and amplitude values. Two separate watermark components may be represented as two separate sine waves in the media signal. In some examples, these sine waves each begin at the same time and with the same value (e.g., a voltage (V) value of zero, a decibel (dB) value of zero, etc.). In other examples, the sine waves are offset or shifted such that one begins (e.g., at a voltage value of zero and a decibel value of zero) at a time after the other begins.

Example apparatus, systems, articles of manufacture (e.g. physical storage media), and methods for media measurement via watermarking with phase shifting are disclosed herein. Example media measurement techniques disclosed herein use a phase shift pattern across a frequency plot, where a phase shift of the same frequency can describe unique symbols. These techniques can reduce the number of frequencies used to convey the same information. This enables the insertion of additional information with other frequencies and/or decreases the overall number frequencies encoded into the watermark. In addition, decreased frequency components make it more difficult for people to decipher the watermark. Example disclosed media measurement techniques enable watermark components to carry additional information by shifting the starting phase value of one or more of the watermark components. As such, payload size can be increased without needing to increase the frequency content of the watermark.

Example techniques disclosed herein enable watermarks to include more information by shifting the phases of watermark components, which is imperceptible to a human ear, but perceptible to a watermark decoder utilizing analysis techniques disclosed herein. Techniques disclosed herein improve watermark information density in a manner that has no potential perceptible impact on any other aspect of the media signal. Additionally, techniques disclosed herein are backwards-compatible with existing watermark decoders, as the amplitude, frequency, and phase characteristics of watermark components can still be analyzed to determine watermark symbols for watermarks encoded utilizing techniques disclosed herein. Thus, watermarking techniques disclosed herein enable decoding of additional information (e.g., via a phase shift relative to a reference phase) when decoded at a decoder to decode watermarks encoded utilizing starting phase modulation as described herein, without compromising the remaining information carried by the watermark (e.g., from frequency and/or amplitude characteristics).

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Turning to the figures, FIG. 1 is a block diagram of an example environment 100 for watermarking with phase shifting. The environment 100 includes an example media signal 102, an example media distributor 104, an example watermark encoder 106, an example watermarked media signal 108, an example household 110, an example media presentation device 112, an example media monitor 114, an example first watermark decoder 116a, an example second watermark decoder 116b, example media identification data 118, an example audience measurement entity (AME) 120, and an example media measurement system (MMS) 122.

The example media signal 102 of the illustrated example of FIG. 1 is an audio, video, and/or audiovisual signal conveying media. In some examples, the media signal 102 is generated by a content creator (e.g., a production studio, an individual creator, an artist, etc.), a content distributor, or another entity and is provided to the media distributor 104 for transmission to a broader audience. In some examples, the media distributor 104 itself creates the media signal 102. The media signal 102 can be conveyed wirelessly (e.g., via a network, via an antenna, etc.) or via a direct physical connection (e.g., via a cable).

The example media distributor 104 of the illustrated example of FIG. 1 is an entity for transmitting media signals to a broader audience. For example, the media distributor 104 can receive a plurality of media signals conveying media and utilize transmission technology (e.g., antennas, satellites, cable, the Internet, etc.) to make the media signals available to a large audience. In some examples, the media distributor 104 includes the watermark encoder 106 to encode watermarks into the media signal 102, thereby generating the watermarked media signal 108. In some examples, the watermarks may be embedded in the media signal 102 elsewhere (e.g., at a content creator, at a content distributor, at the AME 120, etc.).

The example watermark encoder 106 of the illustrated example of FIG. 1 encodes (e.g., embeds, inputs, etc.) watermarks into the media signal 102 for subsequent identification of media conveyed by the media signal 102. The watermark encoder 106 may be configured by the AME 120 to enable the second watermark decoder 116b at the AME 120 (e.g., at the MMS 122) to readily decode the watermarks. For example, the AME 120 may provide an algorithm, a code mapping, or other tool utilized by the watermark encoder 106 for generating the watermarked media signal 108. The watermark encoder 106 of the illustrated example embeds watermarks into the media signal 102 by embedding numerous watermark components (e.g., frequency components) that include altered amplitude and starting phase values within specific frequency ranges of the media signal 102. In some examples, the watermark encoder 106 alters specific media signal characteristics such that the watermarks are sufficiently hidden (e.g., inaudible, invisible, etc.) to the audience, but are still detectable and identifiable by the AME 120. The watermark encoder 106 can embed one or more watermarks corresponding to a program identifier, a station identifier, a timestamp, and/or any other information that may be useful in identifying the media conveyed in the media signal 102. Further details of the watermark encoder 106 and the techniques performed by the watermark encoder 106 is described in connection with FIG. 2.

The example watermarked media signal 108 of the illustrated example of FIG. 1 is the media signal 102 after being encoded with one or more watermark(s). The watermarked media signal 108 is broadcast to an audience utilizing transmission technology (e.g., antennae, networks, cables, etc.) of the media distributor 104.

The example household 110 of the illustrated example of FIG. 1 is a location where media is consumed and media monitoring (e.g., via the media monitor 114) is performed. The household 110 includes the media presentation device 112 and the media monitor 114. In some examples, the household 110 is a panelist household (e.g., belonging to a person enrolled in a monitoring program associated with the AME 120). As used herein, the term panelist refers to users registered on panels maintained by a ratings entity (e.g., the AME 120). The household 110 can be any location where media monitoring is performed including, for example, an office, a restaurant, and/or any other location where media is consumed.

The example media presentation device 112 of the illustrated example of FIG. 1 is a device that accesses the watermarked media signal 108 for presentation. In some examples, the media presentation device 112 is capable of directly presenting media (e.g., via a display), while in other examples, the media presentation device 112 presents the media on separate media presentation equipment (e.g., speakers, a display, etc.). The media presentation device 112 may be, for example, a television, which may be directly capable of presenting media (e.g., via an integrated and/or connected display and speakers). The household 110 may include any type or number of media device(s) that access the watermarked media signal 108. In some examples, the media presentation device 112 is connected (e.g., via a wireless connection and/or a wired connection) with the media monitor 114.

The example media monitor 114 of the illustrated example of FIG. 1 performs media measurement tasks. In some examples, the media monitor 114 records media presented on the media presentation device 112 (e.g., via a microphone). In some such examples, the media monitor 114 is a standalone device separate from the media presentation device. For example, the media monitor 114 may be wirelessly connected to the media presentation device 112 and/or removably connected (e.g., via connections such as HDMI, USB, Ethernet, or other connections) to the media presentation device 112. In some examples, the media monitor 114 is installed in (e.g., integral to) the media presentation device 112. For example, the media monitor 114 may include one or more hardware and/or software components embedded in the media presentation device 112. The media monitor 114 of the illustrated example generates the media identification data 118 based on the watermarked media signal 108 presented by the media presentation device 112. In some examples, the media monitor 114 is a portable device to be carried by a panelist.

The example first watermark decoder 116a and the example second watermark decoder 116b of the illustrated example of FIG. 1 analyze characteristics of the watermarked media signal 108 to decode watermarks embedded in the watermarked media signal 108. The first and second watermark decoders 116a, 116b may be the same component (e.g., include of the same hardware and/or software), but are illustrated separately to represent the possibility that the watermarked media signal 108 is decoded at the media monitor 114 at the household 110 as well as the possibility that the watermarked media signal 108 is decoded at the MMS 122 of the AME 120. For example, the AME 120 may utilize the second watermark decoder 116b to ensure that watermarks are encoded in the media signal 102 (e.g., to enable accurate media monitoring). The media monitor 114 includes the first watermark decoder 116a to identify media conveyed in the watermarked media signal 108 and generate the media identification data 118.

The first and second watermark decoders 116a, 116b can generate a characteristic representation of the watermarked media signal 108 to enable identification of watermark components in the watermarked media signal 108. For example, the first and second watermark decoders 116a, 116b can convert the watermarked media signal 108 using a Fast Fourier Transform (FFT), a Discrete Fourier Transform (DFT), or other type of transform to convert the watermarked media signal 108 from the time domain to the frequency domain. The first and second watermark decoders 116a, 116b of the illustrated example identify and decode watermark components based on repetitive characteristics including frequency, amplitude, and phase values of the watermarked media signal 108. For example, the first and second watermark decoders 116a, 116b can analyze specific frequency ranges that are determined to be suitable for embedding watermarks to determine whether watermark components are present. The first and second watermark decoders 116a, 116b of the illustrated example determine a reference phase pattern and starting phase values of one or more watermark components of the watermarked media signal 108, and subsequently determine a phase offset for the watermark components and information (e.g., represented as bit values, code values, etc.) based on the phase offset. Further detail of the first and second watermark decoders 116a, 116b is illustrated and described in association with the example watermark decoder 116 of FIG. 8.

The media identification data 118 of the illustrated example of FIG. 1 is data corresponding to media detected by the media monitor 114. The media identification data 118 can include one or more media presentation records communicating media presented via the media presentation device 112, or communicating identifying information associated with the watermarked media signal 108 (e.g., a program name, a station name, a channel name, etc.). In some examples, the media identification data 118 includes timestamps, user identification data (e.g., a panelist ID), media presentation device data (e.g., a device ID, a device name, a device status, etc.), and/or media monitoring device data (e.g., a power level, a connection status, etc.). In some examples, the media identification data 118 is regularly communicated to the AME 120. In some examples, the media identification data 118 is stored locally at the media monitor 114 and communicated to the AME 120 upon request (e.g., in response to a query from the AME 120).

The AME 120 of the illustrated example of FIG. 1 is an entity responsible for collecting media monitoring information. The AME 120 collects media monitoring data (e.g., such as the media identification data 118) from a plurality of monitors to determine, among other things, media consumption habits, advertising exposure, audience size, etc. The AME 120 of the illustrated example includes the MMS 122. In some examples, the MMS 122 is at a separate location and/or is a separate entity from the MMS 122. For example, the MMS 122 may be operated by a separate company or organization, which then provides (e.g., as a service) aggregate media monitoring data to the AME 120.

The MMS 122 of the illustrated example of FIG. 1 is a location that observes and/or collects data regarding media signals. The MMS 122 is utilized by the AME 120 to track aggregate media information at a specific location. For example, the MMS 122 may include a wide variety of media signal reception technologies (e.g., antennae, satellite receivers, networks, etc.) to optimize a number of media signals accessed. The MMS 122 can verify programming (e.g., check broadcast media signals with expected programming, expected advertisements, etc.) based on metadata, watermarks (e.g., decoded by the second watermark decoder 116b), signatures, and/or any other identification technique.

In an example operation, the media signal 102 is accessed by the media distributor 104 at the watermark encoder 106, which encodes watermarks in the media signal 102 to generate the watermarked media signal 108. The household 110 accesses the watermarked media signal 108 via the media presentation device 112, which is monitored by the media monitor 114. The first watermark decoder 116*a* of the media monitor 114 decodes watermarks embedded in the watermarked media signal 108 and generates the media identification data 118. The AME 120 receives the media identification data and additionally or alternatively accesses the watermarked media signal 108 at the MMS 122, which includes a second watermark decoder 116*b* to decode the watermarks embedded in the watermarked media signal 108.

Figure 2:
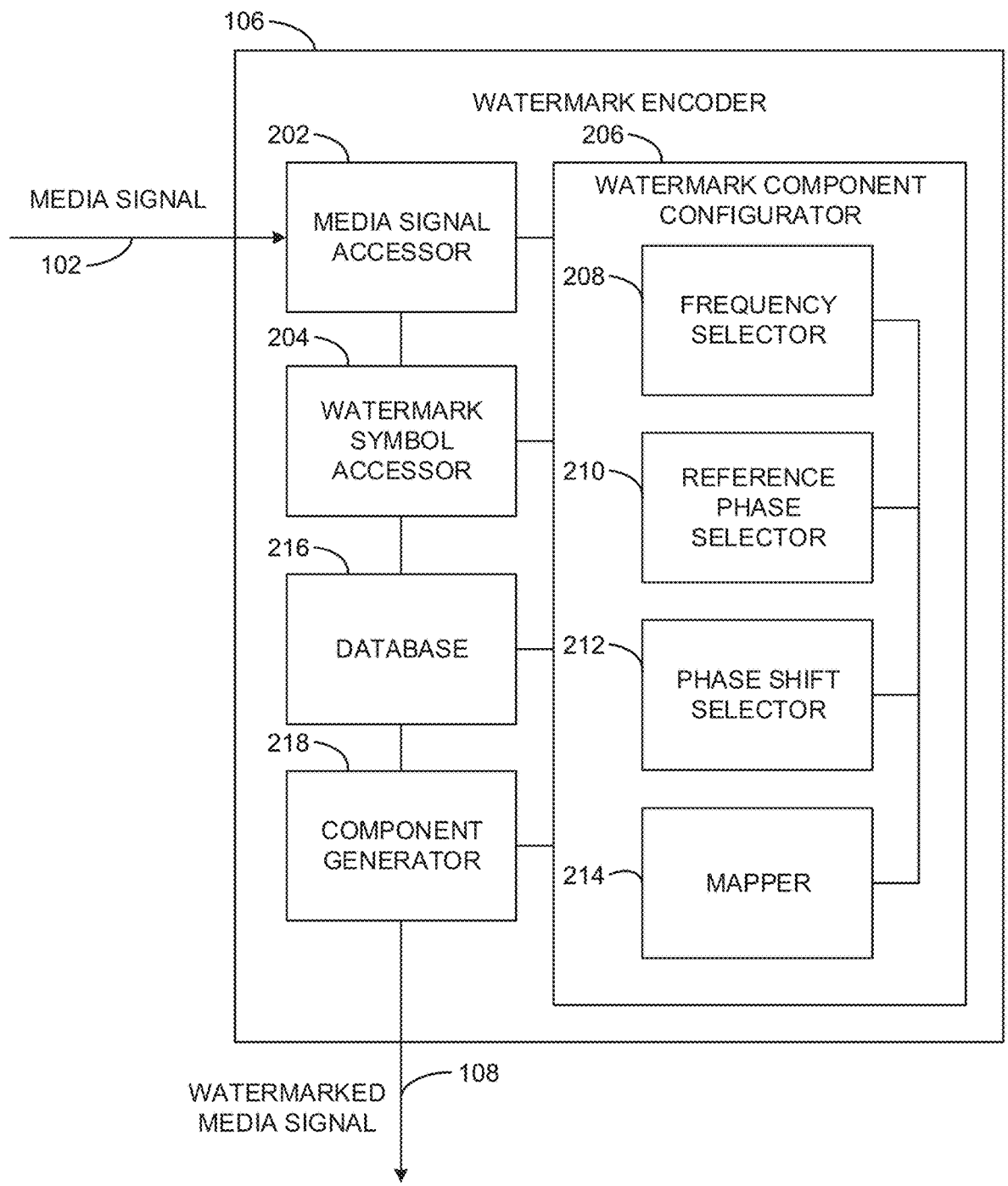
FIG. 2 is a block diagram of the example watermark encoder of FIG. 1 to encode watermarks with phase shifting in accordance with the teachings of this disclosure.

FIG. 2 is a block diagram of an example implementation of the watermark encoder 106 of FIG. 1 to encode watermarks with phase shifting in accordance with the teachings of this disclosure. The watermark encoder 106 includes an example media signal accessor 202, an example watermark symbol accessor 204, an example watermark component configurator 206, an example frequency selector 208, an example reference phase selector 210, an example phase shift selector 212, an example mapper 214, an example database 216, and an example component generator 218.

The example media signal accessor 202 of the illustrated example of FIG. 2 accesses the media signal 102. For example, the media signal accessor 202 may include transmission technology (e.g., antennae, network(s), cable(s), etc.). In some examples, the media signal accessor 202 may access identifying information (e.g., metadata, signatures, etc.) associated with the media signal 102, which can be utilized by the watermark symbol accessor 204 to determine watermarks to be encoded in the media signal 102.

Figures 3, 4:
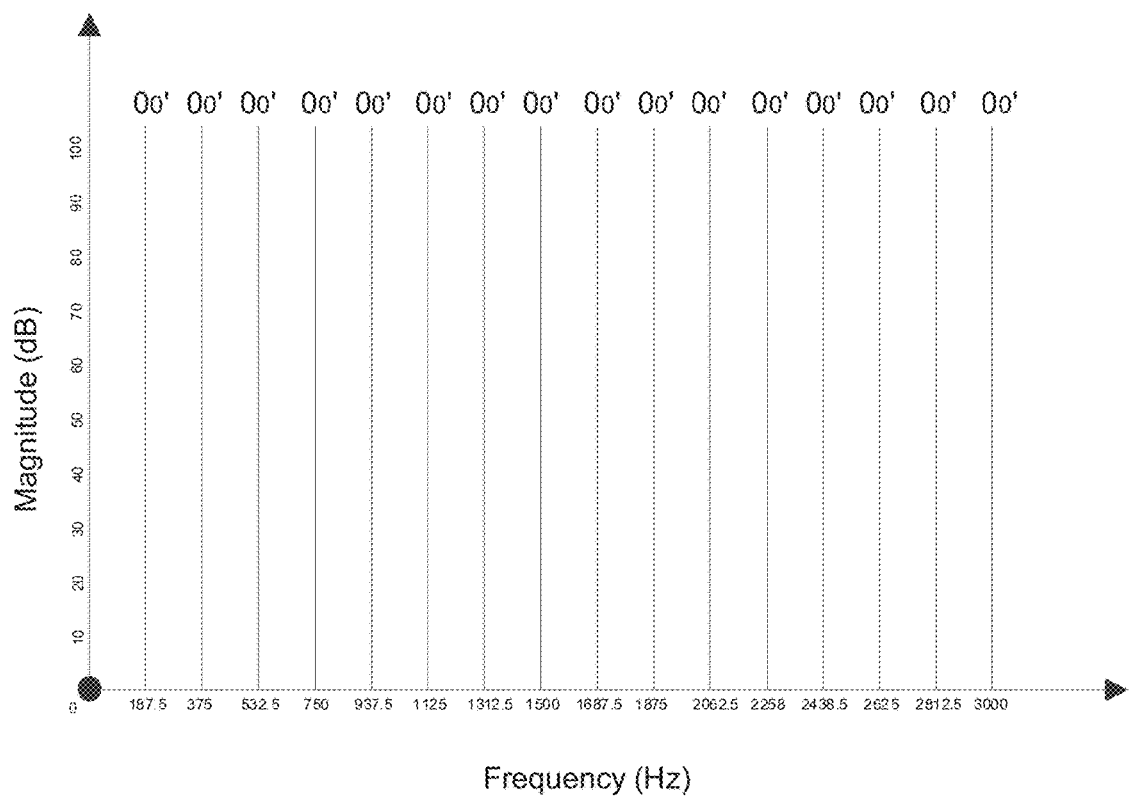
FIG. 3 is a block diagram of an example watermark.
FIG. 4 is a graphical representation of an example frequency plot for example frequencies that may be used to represent symbols in the watermark.

The example watermark symbol accessor 204 of the illustrated example of FIG. 2 accesses watermark symbols and other auxiliary information to be conveyed in one or more watermarks in the media signal 102. An example watermark signal is shown in FIG. 3. The example watermark signal includes twelve symbols. In some examples, the entire watermark is broadcast over 4.8 seconds. In such example, each symbol is broadcast for 0.4 seconds. In other examples, other amounts of symbols and/or time durations may be used. In some examples, the symbols of the watermark are broadcast for different durations of time such that each symbol does not have the same duration.

In the illustrated example, the X symbol and the Y symbol are alignment symbols that are fixed for the watermarks. In an example of critical band encoding technology (CBET), the X symbol and the Y symbol are the same for all CBET codes, and the position of the X symbol and the Y symbol within the CBET watermarks are always located in the same position. If a watermark is detected in the middle of the watermark, the alignment symbols indicate specific positions in the watermark. For example, the X symbol indicates where the watermark begins. In other examples, an audio signal may be distorted and only portions of a watermark may be detected. The X symbol signals the start of the watermark, and when the watermark is repeated, the interested party will know when the watermark begins. The Y symbol indicates where an offset or error check for the watermark begins.

The α symbol, the β symbol, and the γ symbol are codes that provide the information broadcast by the watermark including, for example, station identification information, program or media identification information, and other information desired to be included and broadcast in the watermark. In some examples, the α, β, and γ symbols are all different from each other. The α' symbol, the β' symbol, and the γ' symbol are offset or error-checking codes. These symbols correspond to the α symbol, the β symbol, and the γ symbol, respectively. In some examples, the α' symbol, the β' symbol, and the γ' symbol are shifted by a frequency of 180 degrees from the respective corresponding α symbol, β symbol, and γ symbol. The offset symbols are included as references or error checking. The error checking feature is useful when, for example, an audio signal containing the portion of the watermark including the α symbol, the β symbol, and/or the γ symbol is corrupted, is not gathered, is obscured by noise, etc. In the example disclosed herein, the α symbol, the β symbol, the γ symbol, α' symbol, the β' symbol, and the γ' symbol are unique hexadecimal values, 0-F. In some examples, the offset symbols (α', β', γ') are hexadecimally shifted from the α symbol, the β symbol, the γ symbol by the same amount. For example, all may be shifted by three. For example, where α=6, β=7, and γ=8, and there is a hexadecimal shift of three, then α'=9, β'=A, and γ'=B. In other examples, other shift amounts may be used. In this example, each of the symbols also contains sixteen unique frequencies.

The example watermark also includes four T symbols. The T symbols identify the time that the material was encoded in the watermark.

In some examples, the watermark symbol accessor 204 determines watermark symbols (e.g., α' symbol, the β' symbol, the γ' symbol, α' symbol, the β' symbol, and the γ' symbol) to be encoded into the media signal 102 based on identifying information (e.g., metadata, signatures, etc.) provided by the media signal accessor 202, communicated by the AME 120, or communicated by an external entity (e.g., a content creator, a publisher, etc.). In some examples, the watermark symbol is directly communicated to the media distributor 104 by the AME 120. The watermark symbol accessor 204 of the illustrated example can access watermark symbols based on pre-determined watermark symbols (e.g., stored in a reference watermark table) corresponding to identifying information. In some examples, the watermark symbol accessor 204 algorithmically determines watermark symbols based on the identifying information. In some examples, watermark symbols accessed by the watermark symbol accessor 204 include watermark symbols and auxiliary information determined by the media distributor 104 to enable subsequent identification of information specific to the media distributor 104 during media measurement (e.g., identification of a station name, identification of a transmission type, etc.).

The example watermark component configurator 206 of the illustrated example of FIG. 2 determines signal characteristics to represent the watermark symbols. To accomplish this, the watermark component configurator 206 includes the frequency selector 208, the reference phase selector 210, the phase shift selector 212, and the mapper 214.

The example frequency selector 208 of the illustrated example of FIG. 2 selects frequency ranges within the media signal 102 where watermark components can be embedded. For example, the frequency selector 208 can analyze the media signal 102 and determine frequency ranges that can be altered (e.g., by inserting the watermark component) without a perceptible difference for a listener. This may be referred to as frequency masking. In some examples, the frequency selector 208 analyzes specific frequency ranges that are known to be difficult to perceive by a human ear. The frequency selector 208 selects one or more frequency ranges within which one or more watermark components are to be embedded. In some examples, the frequency selector 208 selects the one or more frequency ranges based on whether or not the media signal 102 already has a substantial amplitude within the specific frequency range. For example, the frequency selector 208 can select a frequency range that is known (e.g., via psychoacoustic studies) to be suitable for embedding watermark components and determine that the media signal 102 has an amplitude exceeding a signal threshold (representing the highest allowable amplitude of the media signal 102 that can be present within a same frequency range as a watermark component). In response to the amplitude of the media signal 102 exceeding the signal threshold, the frequency selector 208 indicates that the analyzed frequency range is not suitable for embedding a watermark component, as a signal-to-noise ratio for the watermark component in the analyzed frequency range would be too low, making decoding the watermark component difficult.

In some examples, in response to an analyzed frequency range being both (a) suitable for embedding the watermark component based on a low probability of auditory perception and (b) the media signal 102 not having amplitude in excess of the signal threshold, the frequency selector 208 can select the analyzed frequency range for embedding a watermark component.

FIG. 4 is an example plot of frequencies that may be used to represent symbols in the watermark. In the example of FIG. 4 sixteen unique frequencies in a range of frequencies from 1-3 kilohertz (kHz) are shown. Any range of frequencies and increment between frequencies can be used. In the example of FIG. 4, the magnitude or amplitude for each selected frequency is shown as 100 dB for ease of representation. The actual magnitude will vary in accordance with the underlying audio material in the media signal 102 as disclosed above.

The reference phase selector 210 selects a reference phase signal, which may also be referred to as the phase reference. The phase reference is a fixed phase against which the phases of the other symbols of the watermark are to be compared to determine any phase shifts of the other symbols. In some examples, a phase reference may be selected for each of the selected frequencies such as, for example, the frequencies selected in FIG. 4. Some factors to consider when selecting a phase reference include, for example, spacing frequencies to ensure masking within the media signal, considering the number of frequencies so that the quality of the media signal is not blocked or compromised while ensuring enough a robust amount of frequencies to enhance detection, and other factors disclosed herein. In some examples, the phase reference is different for different watermarks. Also, in some examples, the phase reference includes a set of reference phases each associated with a corresponding one of the watermark components. For example, each component could have the same reference phase (e.g., 0 degrees) or different components could have different reference phases.

Figure 5:
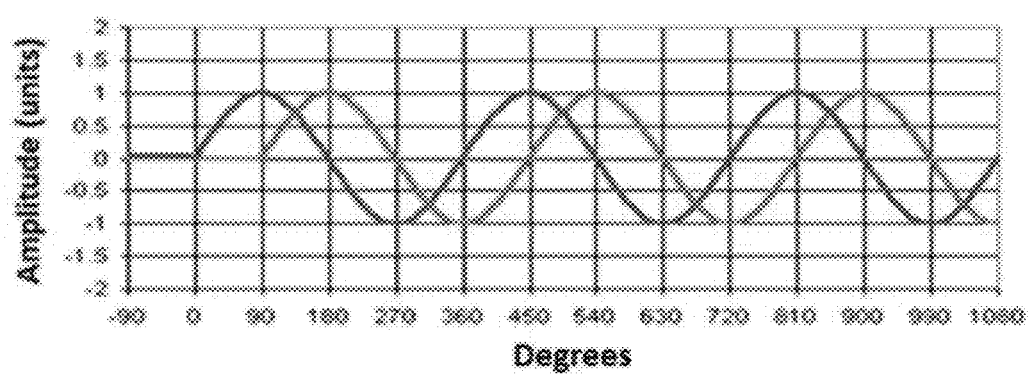
FIG. 5 is a graphical representation of an example phase shift between two signals.

The phase shift selector 212 selects phase shifts for the selected frequencies. A signal with a frequency that is phase shifted begins or operates out of sequence with the phase of a reference signal. An example of a phase shift between two signals is shown in FIG. 5. A first signal, the phase reference, is represented by the sine wave that begins at 0 degrees. In other words, the first signal has a zero amplitude at 0 degrees. A second signal, which is phase shifted, is represented by the sine wave that begins at 90 degrees. In other words, the second signal has a zero amplitude at 90 degrees. Thus, in this example, the phase shift is 90 degrees.

Figures 6, 7:
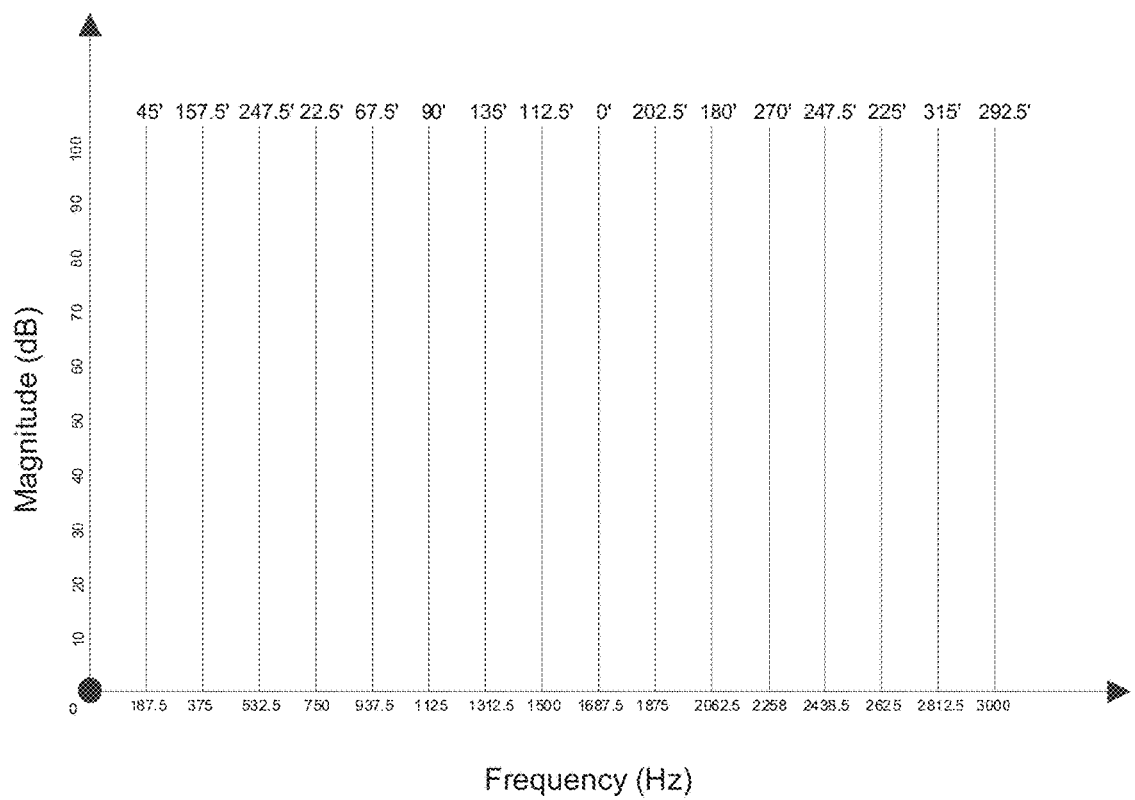
FIG. 6 is a graphical representation of another example frequency plot for example frequencies and phase shifts that may be used to represent symbols in the watermark.
FIG. 7 is a block diagram of an example watermark including an example phase shift reference.

FIG. 6 is an example plot of frequencies and phase shifts that may be used to represent symbols in the watermark. Similar to FIG. 4, in the example of FIG. 6, sixteen unique frequencies in a range of frequencies from 1-3 kHz are shown. Any range of frequencies and increment between frequencies can be used. In the example of FIG. 6, the magnitude or amplitude for each selected frequency is shown as 100 dB for ease of representation. The actual magnitude will vary in accordance with the underlying audio material in the media signal 102 as disclosed above. In FIG. 4, the frequencies were not phase shifted, as denoted by the $0_0'$ across the top of the frequency lines. The frequencies in FIG. 6 are shown with different phase shifts per frequency. For example, 187.5 kHz is phase shifted 45 degrees relative to the phase reference. 375 kHz is phase shifted 157.5 degrees from the phase reference. Other examples are shown in FIG. 6. In some examples, all the frequencies have the same phase shift (e.g., all at 0 degrees (FIG. 4), all at 45 degrees, etc.). In other examples, each frequency has a unique phase shift. Also, in some examples, some frequencies in the same frequency plot have the same phase shift while other frequencies in that frequency plot have different phase shifts (e.g., FIG. 6 where 532.5 kHz and 2438.5 kHz are both shifted by 247.5 degrees and other frequencies have other phase shifts). In some examples, the phase shifts are evenly incremented between frequencies. In other examples, there are uneven incremental phase shifts. Also, as noted above, different frequencies and different amounts of frequencies may be used. Thus, with different frequencies, different amounts of frequencies, and different phases, there abundant combinations of frequencies and phase shifts that may be used to code watermark symbols.

Different ones of the α, β, γ, α', β', and/or γ' symbols may be represented by different phase shift patterns across different frequency plots. Thus, different frequency plots such as shown in FIG. 6 using different frequencies and/or different phase shifts may be used to represent the α, β, γ, α', β', and/or γ' symbols. Further, the different frequency plots that represent the α, β, γ, α', β', and/or γ' symbols may change from one watermark to the next. In some examples, the magnitudes may also change among the frequencies, among the symbol representations, and/or among the watermarks.

The mapper 214 correlates the phase shift pattern to a coded numerical representation. In some examples, the correlation is a reference table. Also, in some examples, the numerical representation is a hexadecimal representation. Thus, in some examples, the mapper 214 creates a table mapping the phase shifts in the phase shift pattern to a hexadecimal number for the watermark symbols. An example table includes:

| Hexadecimal Number | Phase Shift (degrees) |
|---|---|
| 0 | 0 |
| 1 | 22.5 |
| 2 | 45 |
| 3 | 67.5 |
| 4 | 90 |
| 5 | 112.5 |
| 6 | 135 |
| 7 | 157.5 |
| 8 | 180 |
| 9 | 202.5 |
| A | 225 |
| B | 247.5 |
| C | 270 |
| D | 292.5 |
| E | 315 |
| F | 337.5 |

In this example, the 0-7 values can represent one of the α symbol, the β symbol, or the γ symbol, and the 8-F values represent a corresponding offset either the α' symbol, the β' symbol, or the γ' symbol. As shown in the example above, the 8-F values are 180 degrees offset from the 0-7 values. Also, in the example above, the phase shifts are incremented per hexadecimal number by 22.5 degrees, evenly across the hexadecimal numbers. 22.5 degrees may be selected for ease of calculation because a full rotation of phase shifting is 360 degrees. 360 degrees divided evenly among sixteen hexadecimal numbers is 22.5 degrees per hexadecimal number. In other examples, the change between phase shifts can be other incremental values. Also, in some examples, the change between phase shifts can be uneven increments. In some examples, the increments or spacing between phase shifts is arbitrarily selected. One factor to consider is to select phase shifts that are not incremented too closely but, rather, are spaced apart enough to facilitate discerning or detecting the different phase shifts. The table and other information used in the watermarking process may be stored in the database 216.

In some examples, the frequency selector 208, the reference phase selector 210, the phase shift selector 212, and the mapper 214 are part of a system external to the watermark encoder 106. In such example, the some or all of the functions of the watermark component configurator 206 are not performed at the broadcaster 104. In these examples, the watermark component configurator 206 may be used to retrieve or receive the data (e.g., the table) for use by the watermark encoder 106 to encode watermarks into the media signal 102. In some examples in which watermark component parameter determination occurs separate from the watermark component configurator 206, the watermark component configurator 206 maintains function of the mapper 214.

The component generator 218 of the illustrated example of FIG. 2 generates watermark components based on frequency ranges selected by the frequency selector 208, the phase reference selected by the reference phase selector 210, and the phase shift selected by the phase shift selector 212. An example watermark generated by the watermark component generator is shown in FIG. 7. The X symbol and the Y symbol are the alignment symbols. A phase reference is embedded after the X symbol. For example, a sine wave to be used as the phase reference appears in the watermark after the X symbol. The same or a different phase reference also appears after the Y symbol. The α symbol, the β symbol, the γ symbol, the α' symbol, the β' symbol, and the γ' symbol are embedded with respective phase shifts as defined by the mapper 214. The T symbols are embedded to represent time. In this example, the watermark includes fourteen symbols. In some examples, the duration of the fourteen symbols can be evenly or unevenly split across the 4.8 seconds that the watermark is broadcast. In other examples, the fourteen symbols can be broadcast for 0.4 seconds, lengthening the duration of the watermark to 5.6 seconds. Other durations of individual symbols and/or the entire watermark may also be used.

In some additional or alternative examples, the component generator also performs position modulation. In examples disclosed herein, the watermark symbols may be broadcast for a duration of 0.4 seconds, or 400 milliseconds (ms). In this example, the first half of the period (e.g., 0-200 ms) may be used to broadcast hexadecimal symbols 0-8, and the second half of the period (e.g., 201-400 ms) may be used to broadcast hexadecimal symbols 9-F. In these examples, just eight different possible phase offsets can be used to encode the watermark symbol because the position in the symbol (e.g., 0-200 ms or 201-400 ms) identifies whether the encoded value corresponds to a value in the first group (e.g., 0-8) or a value in the second group (e.g. 9-F). In other examples, other time periods greater than or less than 200 ms may be used. Also, in other examples, the hexadecimal values may be divided between the groups different. Also, in other examples, other number of groups may be used (e.g., three, four, etc.).

After embedding the watermark components representing the watermark symbol into the media signal 102, the component generator 218 outputs the watermarked media signal 108. For example, the component generator 218 may output the watermarked media signal 108 to another component of the media distributor 104 (e.g., to transmission equipment to broadcast the watermarked media signal 108).

In operation, the media signal 102 is accessed by the media signal accessor 202 to initiate the encoding process. The watermark symbol accessor 204 accesses one or more watermark symbols and auxiliary information to be encoded into the media signal 102. The watermark component configurator 206 determines specific parameters of the watermark components to be embedded. The frequency selector 208 selects frequency ranges at which to embed the watermark components. The reference phase selector 210 selects a phase reference to embed in the watermark, and the phase shift selector 212 determines phase shifts for the watermark symbols. These parameters are mapped by the mapper 214 and stored in the database 216. In other examples, the watermark component configurator 206 determines the specific parameters of the watermark components by retrieving the parameters as produced separately from the watermark component configurator 206. The component generator 216 utilizes the frequency, phase reference, and phase shifts to embed watermarks into the media signal 102 and generate the watermarked media signal 108.

In some examples, the media signal accessor 202 implements means for accessing a media signal. The means for accessing a media signal may be implemented by a processor such as the processor 612 of FIG. 11 executing instructions such as the instructions of FIG. 9. In some examples, the watermark symbol accessor 204 implements means for accessing a watermark symbol. The means for accessing a watermark symbol may be implemented by a processor such as the processor 612 of FIG. 11 executing instructions such as the instructions of FIG. 9. In some examples, the watermark component configurator 206 implements means for configuring a watermark component. The means for configuring a watermark component may be implemented by a processor such as the processor 612 of FIG. 11 executing instructions such as the instructions of FIG. 9. In some examples, the frequency selector 208 implements means for selecting a frequency, a plurality of frequencies, and/or a frequency plot. The means for selecting a frequency and/or frequency plot may be implemented by a processor such as the processor 612 of FIG. 11 executing instructions such as the instructions of FIG. 9. In some examples, the reference phase selector 210 implements means for selecting a phase reference. The means for selecting a phase reference may be implemented by a processor such as the processor 612 of FIG. 11 executing instructions such as the instructions of FIG. 9. In some examples, the phase shift selector 212 implements means for selecting a phase shift and/or a phase shift pattern. The means for selecting a phase shift may be implemented by a processor such as the processor 612 of FIG. 11 executing instructions such as the instructions of FIG. 9. In some examples, the mapper 214 implements means for correlating the phase shift pattern to a watermark code and/or a value of a watermark symbol (e.g., a hexadecimal number). The means for correlating the phase shift pattern to a watermark code may be implemented by a processor such as the processor 612 of FIG. 11 executing instructions such as the instructions of FIG. 9. In some examples, the component generator 218 implements means for generating a watermark component. The generating means may be implemented by a processor such as the processor 612 of FIG. 11 executing instructions such as the instructions of FIG. 9.

While an example manner of implementing the watermark encoder 106 of FIG. 1 is illustrated in FIG. 2, one or more of the elements, processes, and/or devices illustrated in FIG. 2 may be combined, divided, re-arranged, omitted, eliminated, and/or implemented in any other way. Further, the example media signal accessor 202, the example watermark symbol accessor 204, the example watermark component configurator 206, the example reference phase selector 210, the example phase shift selector 212, the example mapper 214, the example database 216, the example component generator 218, and/or, more generally, the example watermark encoder 106 of FIG. 2 may be implemented by hardware, software, firmware, and/or any combination of hardware, software, and/or firmware. Thus, for example, any of the example media signal accessor 202, the example watermark symbol accessor 204, the example watermark component configurator 206, the example reference phase selector 210, the example phase shift selector 212, the example mapper 214, the example database 216, the example component generator 218, and/or, more generally, the example watermark encoder 106 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example, media signal accessor 202, the example watermark symbol accessor 204, the example watermark component configurator 206, the example reference phase selector 210, the example phase shift selector 212, the example mapper 214, the example database 216, the example component generator 218, and, the example watermark encoder 106 is/are hereby expressly defined to include a non-transitory computer readable storage device or storage disk such as a memory, a digital versatile disk (DVD), a compact disk (CD), a Blu-ray disk, etc. including the software and/or firmware. Further still, the example watermark encoder 106 of FIG. 2 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
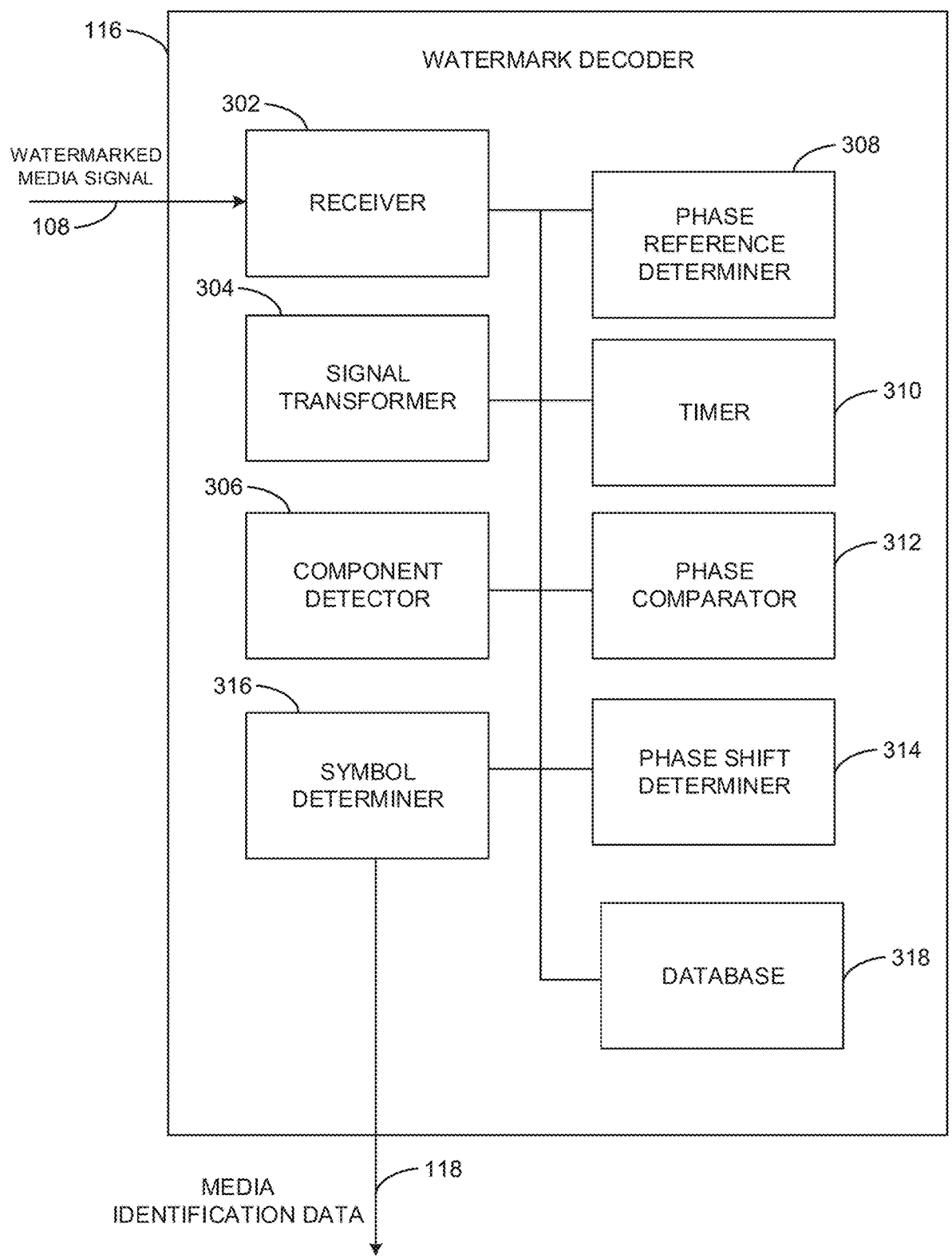
FIG. 8 is a block diagram of the example watermark decoder of FIG. 1 to decode watermarks encoded with phase shifting in accordance with the teachings of this disclosure.

FIG. 8 is a block diagram of the example watermark decoder 116 of FIG. 1 to decode watermarks utilizing phase shifting in accordance with the teachings of this disclosure. The watermark decoder 116 includes an example receiver 302, an example signal transformer 304, an example component detector 306, an example phase reference determiner 308, an example timer 310, an example phase comparator 312, an example phase shift determiner 314, an example symbol determiner 326, and an example database 318.

The example receiver 302 of the illustrated example watermark decoder 116 of FIG. 8 accesses the watermarked media signal 108. For example, the receiver 302 may include transmission technology (e.g., antennae, network(s), cable(s), etc.). In some examples, the receiver 302 may access identifying information (e.g., metadata, signatures, etc.) associated with the media signal 108, which can be utilized by the watermark decoder 116 to determine watermarks encoded in the media signal 108.

The example signal transformer 304 of the illustrated example of FIG. 3 accesses and analyzes the watermarked media signal 108 and transforms the watermarked media signal 108 to a representation to enable identification of watermarks. For example, the signal transformer 304 can utilize a Fast Fourier Transform (FFT) to convert the watermarked media signal 108 to the frequency domain. The signal transformer 304 converts the watermarked media signal 108 to a form in which the signal transformer 304 and the watermark decoder 116 in general can identify frequency, amplitude, and/or phase characteristics of watermarks encoded in the watermarked media signal 108. In some examples, phase data is captured by sampling the watermarked media signal 108 at twice the frequency bandwidth of the filtered signal in accordance with the Nyquist-Shannon sampling theorem.

The example component detector 306 of the illustrated example of FIG. 8 detects watermark components in the watermarked media signal 108. The component detector 306 of the illustrated example analyzes amplitude values of frequency ranges in the watermarked media signal 108 which are known to be associated with watermark components and determines whether the watermarked media signal 108 is boosted in one or more of these frequency ranges. In some examples, the component detector 306 analyzes numerous frequency ranges (e.g., regardless of whether the frequency ranges are known to sometimes include watermark components) throughout the watermarked media signal 108 and determines whether the amplitude of the watermarked media signal 108 in these ranges represents a boosted amplitude. For example, if the watermarked media signal has a significantly higher amplitude value than frequency ranges surrounding an analyzed frequency range, the component detector 306 may determine the analyzed frequency range is boosted. In response to the component detector 306 identifying frequency ranges which appear to include boosted signals relative to other portions of the watermarked media signal 108, the component detector 306 of the illustrated example determines watermark components are embedded in the frequency ranges. In some examples, the component detector 306 may analyze amplitude, frequency, and/or phase values of the watermarked media signal 108 in any other manner based on known, detectable characteristics of watermark components. In some examples, the component detector 306 determines a signal strength parameter (e.g., SNR) for watermark components.

In some examples, the component detector 306 identifies the alignment component (the X symbol) and/or the sync component (the Y symbol). The component detector 306 also identifies the location or position, duration, and signal characteristics including frequency, amplitude, and phase of the other symbols ($\alpha$, $\beta$, $\gamma$, $\alpha'$, $\beta'$, and $\gamma'$) in the watermark using, for example, amplitude calculations, phase calculations, and other algorithms and tools in conjunction with the FFT analysis performed by the signal transformer 304.

In some examples, in which position modulation has been used to encode the watermark, the component detector 306 separately analyzes different positions in a watermark symbol. For example, if the component detector 306 does not detect a consistent watermark in a first position (e.g., the first 200 ms) of a watermark symbol slot, then the component detector 306 analyzes a second position (e.g., the second 200 ms) of the symbol slot.

The phase reference determiner 308 determines the phase references by reading the watermark data that is embedded after the X symbol and/or the Y symbol. As shown in FIG. 7, the phase reference appears in the watermark after the alignment symbols, X and Y. In addition, the phase reference determiner 308 may perform phase calculations. For example, the phase reference determiner 308 ensemble averages the phase reference symbol to confirm the phase information contents.

The example timer 310 of the illustrated example of FIG. 8 tracks an analysis time when analyzing the watermark components including, for example, calculating the phase reference or phase shift values of one or more watermark components. In some examples, when an analyzed time period does not correspond to the start of the watermark component (e.g., based on the detection of the X symbol), the timer 310 of the illustrated example steps back in time by a time step size. In some examples, the timer 310 determines whether a symbol duration has been analyzed. For example, the timer 310 may compare an amount of time that has been analyzed to a symbol duration threshold. Because watermark symbols typically persist for a specific, consistent amount of time, the timer 310 can indicate when an entire symbol duration has been analyzed. In some such examples, in response to the duration threshold being satisfied, processing can conclude.

The phase comparator 312 compares the phases of the α symbol, the β symbol, the γ symbol, the α' symbol, the β' symbol, and the γ' symbol with the phase reference. For example, the phase comparator 312 subtracts the phase of the α symbol from the phase reference; subtracts the phase of the β symbol from the phase reference; and subtracts the phase of the γ symbol from the phase reference. The phase comparator 312 also performs comparisons and subtractions for the offset symbols (the α' symbol, the β' symbol, and the γ' symbol).

The phase shift determiner 314 determines the respective phase shifts based on the comparison and/or subtraction processes performed by the phase comparator 312.

The symbol determiner 316 uses the phase shifts to identify a coded numerical representation that is correlated with the phase shifts. For example, the symbol determiner 316 uses the phase shifts to identify a hexadecimal symbol that matches the phase shift using for example the table developed by the mapper 214 of the watermark encoder 106. In some examples, the receiver 302 accesses or receives the table. The matching hexadecimal symbol is correlated to the watermark symbol. For example, based on the example table provided above, the symbol determiner 316 matches a phase shift of 45 degrees with the hexadecimal number 2. A phase shift of 225 degrees is matched with the hexadecimal number of A. A phase shift of 315 degrees is matched is a hexadecimal number of E. Thus, in an example in which the watermark decoder 116 determines that the α symbol has a phase shift of 45 degrees, the β symbol has a phase shift of 225 degrees, and the γ symbol has a phase shift of 315 degrees, the resulting α-β-γ portion of the watermark will be translated to 2AE. The symbol determiner 316 compiles the watermark codes represented with the hexadecimal numbers for the components across of the watermark and additional watermarks detected in the watermarked media signal 108. In some examples, the phase shifts of the components combine to represent one symbol during α symbol duration (e.g., 400 ms).

The watermark code, the table, the phase information, and other data disclosed herein may be stored in the database 318 for subsequent access, transmission to the AME 120, and/or other use. In some examples, the watermark code is communicated to the AME 120 for subsequent interpretation.

In some examples, the receiver implements receiving means. The receiving means may be implemented by a processor such as the processor 712 of FIG. 12 executing instructions such as the instructions of FIG. 11. In some examples, the signal transformer 304 implements transforming means. The transforming means may be implemented by a processor such as the processor 712 of FIG. 12 executing instructions such as the instructions of FIG. 11. In some examples, the component detector 306 implements detecting means. The detecting means may be implemented by a processor such as the processor 712 of FIG. 12 executing instructions such as the instructions of FIG. 11. In some examples, the phase reference determiner 308 component detector implements means for identifying a phase reference. The means for identifying a phase reference may be implemented by a processor such as the processor 712 of FIG. 12 executing instructions such as the instructions of FIG. 11. In some examples, the timer 310 implements timing means. The timing means may be implemented by a processor such as the processor 712 of FIG. 12 executing instructions such as the instructions of FIG. 11. In some examples, the phase comparator 312 implements means for comparing phases. The means for comparing phases may be implemented by a processor such as the processor 712 of FIG. 12 executing instructions such as the instructions of FIG. 11. In some examples, the phase shift determiner 314 implements means for determining phase shift(s). The means for determining phase shift(s) may be implemented by a processor such as the processor 712 of FIG. 12 executing instructions such as the instructions of FIG. 11.

While an example manner of implementing the watermark decoder 116 of FIG. 1 is illustrated in FIG. 8, one or more of the elements, processes, and/or devices illustrated in FIG. 8 may be combined, divided, re-arranged, omitted, eliminated, and/or implemented in any other way. Further, the example receiver 302, the example signal transformer 304, the example component detector 306, the example phase reference determiner 308, the example timer 310, the example phase comparator 312, the example phase shift determiner 314, the example symbol determiner 316, the example database 318, and/or, more generally, the example watermark decoder 116 of FIG. 8 may be implemented by hardware, software, firmware, and/or any combination of hardware, software, and/or firmware. Thus, for example, any of the example receiver 302, the example signal transformer 304, the example component detector 306, the example phase reference determiner 308, the example timer 310, the example phase comparator 312, the example phase shift determiner 314, the example symbol determiner 316, the example database 318, and/or, more generally, the example watermark decoder 116 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example, receiver 302, the example signal transformer 304, the example component detector 306, the example phase reference determiner 308, the example timer 310, the example phase comparator 312, the example phase shift determiner 314, the example symbol determiner 316, the example database 318, and/or, the example watermark decoder 116 is/are hereby expressly defined to include a non-transitory computer readable storage device or storage disk such as a memory, a digital versatile disk (DVD), a compact disk (CD), a Blu-ray disk, etc. including the software and/or firmware. Further still, the example watermark decoder 116 of FIG. 8 may include one or more elements, processes, and/or devices in addition to, or instead of, those illustrated in FIG. 8, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
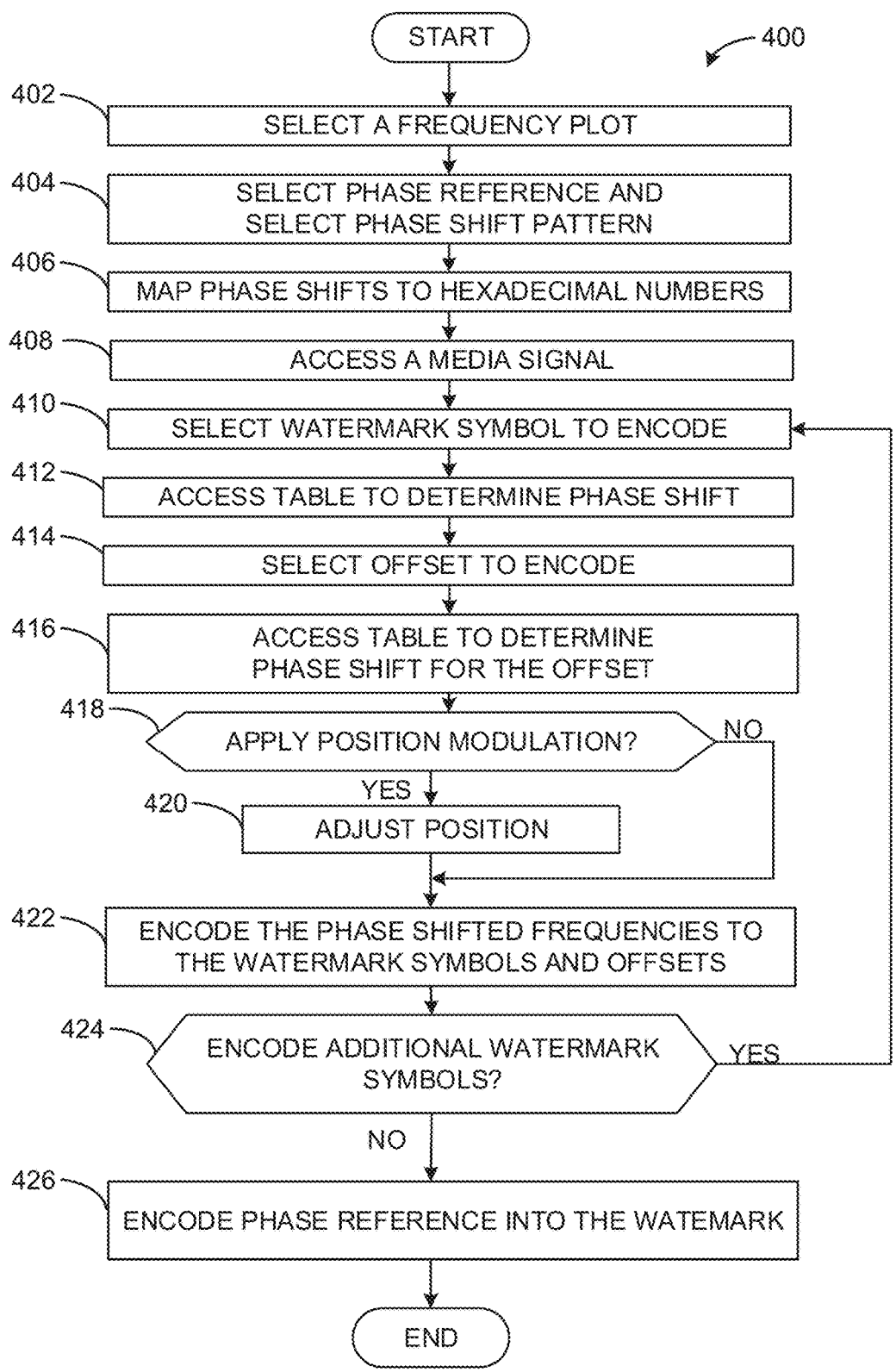
FIG. 9 is a flowchart representative of machine readable instructions which may be executed to implement the example encoder of FIG. 2.
Figure 10:
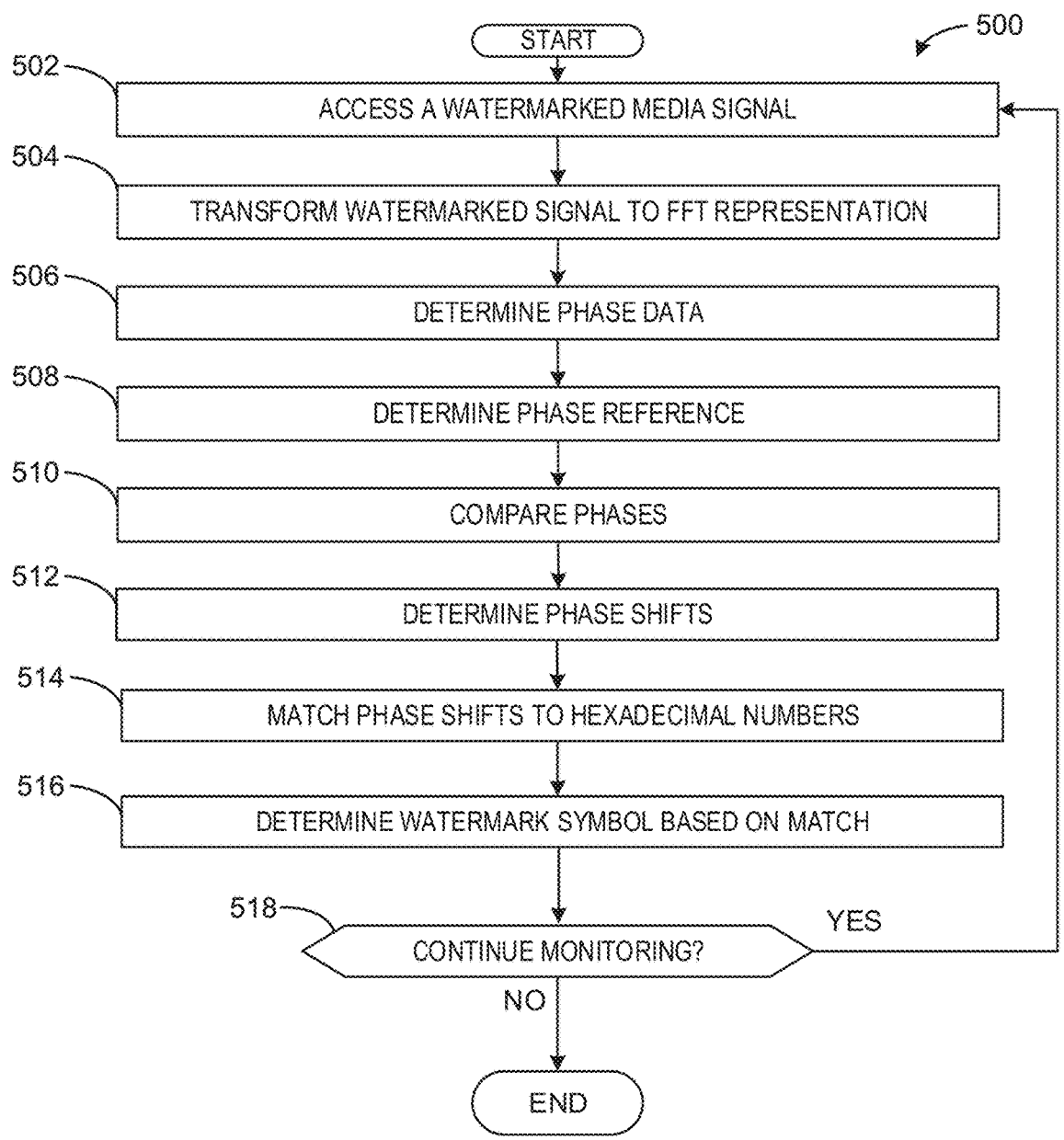
FIG. 10 is a flowchart representative of machine readable instructions which may be executed to implement the example decoder of FIG. 8.

A flowchart representative of example hardware logic, machine readable instructions, hardware implemented state machines, and/or any combination thereof for implementing the watermark encoder 106 of FIGS. 1 and 2 is shown in FIG. 9. In addition, a flowchart representative of example hardware logic, machine readable instructions, hardware implemented state machines, and/or any combination thereof for implementing the watermark decoder 116 of FIGS. 1 and 8 is shown in FIG. 10. The machine readable instructions may be one or more executable programs or portion(s) of an executable program for execution by a computer processor such as the processors 612, 712 shown in the example respective processor platforms 600, 700 discussed below in connection with FIGS. 11 and 12, respectively. The program(s) may be embodied in software stored on a non-transitory computer readable storage medium such as a CD-ROM, a floppy disk, a hard drive, a DVD, a Blu-ray disk, or a memory associated with the respective processor(s) 612, 712, but the entire program and/or parts thereof could alternatively be executed by a device other than the processor(s) 612, 712 and/or embodied in firmware or dedicated hardware. Further, although the example programs are described with reference to the flowcharts illustrated in FIGS. 9 and 10, many other methods of implementing the example watermark encoder 106 and/or watermark decoder 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device, and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 9 and 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program 400 of FIG. 9 is an example watermark encoding process. The program 400 includes the frequency selector 208 of the watermark component configurator 206 selecting a frequency plot for encoding a watermark symbol (block 402). The reference phase selector 210 selects a phase reference, and the phase shift selector 212 selects a phase shift pattern for the encoding of the watermark symbol (block 404). The mapper 214 correlates the phase shift pattern to a coded numerical representation by, for example, mapping the phase shifts to hexadecimal numbers (block 406).

The media signal accessor 202 accessing a media signal (block 408). The component generator 218 selects a watermark symbol to encode (block 410). The component generator 218 accesses the table to determine a phase shift (block 412). The component generator 218 selects an offset to encode (block 414). The component generator 218 accesses the table to determine a phase shift for the offset (block 416).

The component generator 218 determines if position modulation is to be applied (block 418). If position modulation is to be applied, the component generator 218 adjusts the position of the encoding into the watermark symbol (block 420) by, for example, altering the position of the encoding into the first half (e.g., 0-200 ms) or the second half (e.g., 201-400 ms) of the watermark symbol. The component generator encodes the phased shifted frequencies to the watermark symbols and offsets (block 422). If at block 418, the component generator 218 determines that position modulation is not be applied, the component generator 218 continues at block 422 by encoding the phased shifted frequencies to the watermark symbols.

The component generator 218 and/or the watermark encoder 106 in general determines if there are additional watermark symbols to encode (block 424). If there are additional watermark symbols to encode, the component generator 218 continues by selecting the watermark symbol to encode (block 410). If the component generator 218 and/or the watermark encoder 106 in general determine that there are no additional watermark symbols to encode (block 424), the component generator 218 finishes the watermark encoding by encoding the phase reference into the watermark (block 426). The example process 400 for encoding watermarks then ends.

The program 500 of FIG. 10 is an example watermark decoding process. The program 500 includes the receiver 302 accessing the watermarked media signal 108 (block 502). The signal transformer 304 transforms the watermarked signal 108 to an FFT representation (block 504).

The component detector 306 determines phase data (block 506). The phase reference determiner 308 determines the phase reference based on the phase data (block 508). The phase comparator 312 compares phases of the watermark symbols and the phase reference (block 510). For example, the phase comparator 312 subtracts the phase reference from the phases of the watermark symbols. The phase shift determiner 314 determines phase shifts (block 512) based on the comparison.

The symbol determiner 316 matches the phase shifts to coded numerical representations such as, for example, hexadecimal numbers (block 514). The symbol determiner 316 determines watermark symbols based on the matching (block 516). For example, based on the example table provided above, the symbol determiner 316 matches a phase shift of 67.5 degrees with the hexadecimal number 3. A phase shift of 157.5 degrees is matched with the hexadecimal number of 7. A phase shift of 270 degrees is matched is a hexadecimal number of C. Thus, in an example in which the watermark decoder 116 determines that the α' symbol has a phase shift of 67.5 degrees, the β' symbol has a phase shift of 157.5 degrees, and the γ' symbol has a phase shift of 270 degrees, the resulting α'-β'-γ' portion of the watermark will be translated to 37C.

The watermark decoder 116 determines if monitoring of media signals continues (block 518). If the monitoring of media signals continues, the receiver 302 accesses a watermarked media signal 108 (block 502). If the watermark decoder 116 determines that monitoring of media signals does not continue (block 518), the decoding process 500 ends.

Figure 11:
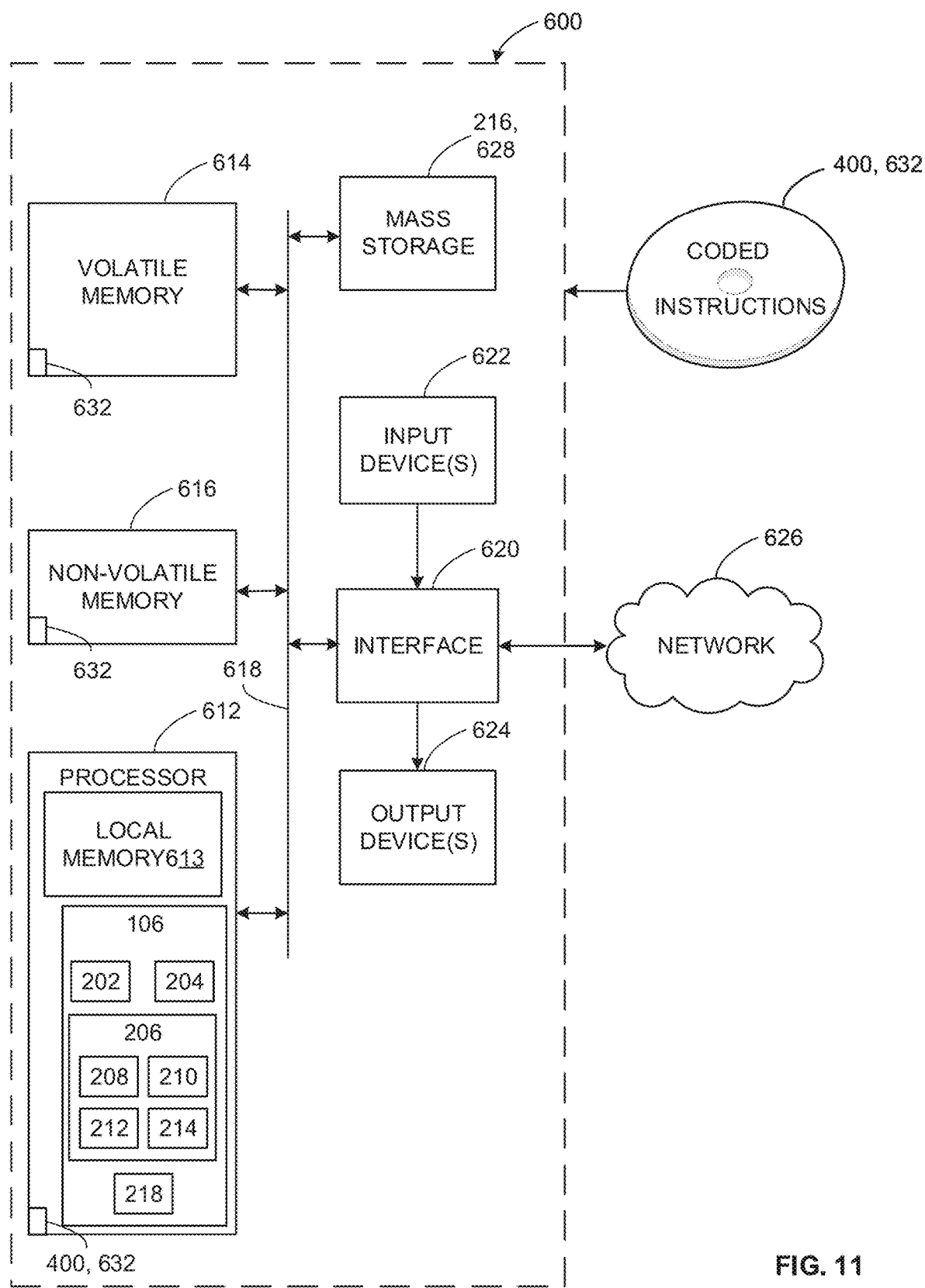
FIG. 11 is a block diagram of an example processing platform structured to execute the instructions of FIG. 9 to implement the example encoder of FIG. 2.

FIG. 11 is a block diagram of an example processor platform 600 structured to execute the instructions of FIG. 9 to implement the apparatus of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 612 implements the encoder 106, the media signal accessor 202, the watermark symbol accessor 204, the watermark component configurator 206, the frequency selector 208, the reference phase selector 210, the phase shift selector 212, the mapper 214, and the component generator 218.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 620 of the illustrated example, thus, typically includes a graphics driver card, a graphics driver chip, and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 9 may be stored in the mass storage device 628, in the volatile memory 614, in the non-volatile memory 616, and/or on a removable non-transitory computer readable storage medium such as a CD or DVD.

Figure 12:
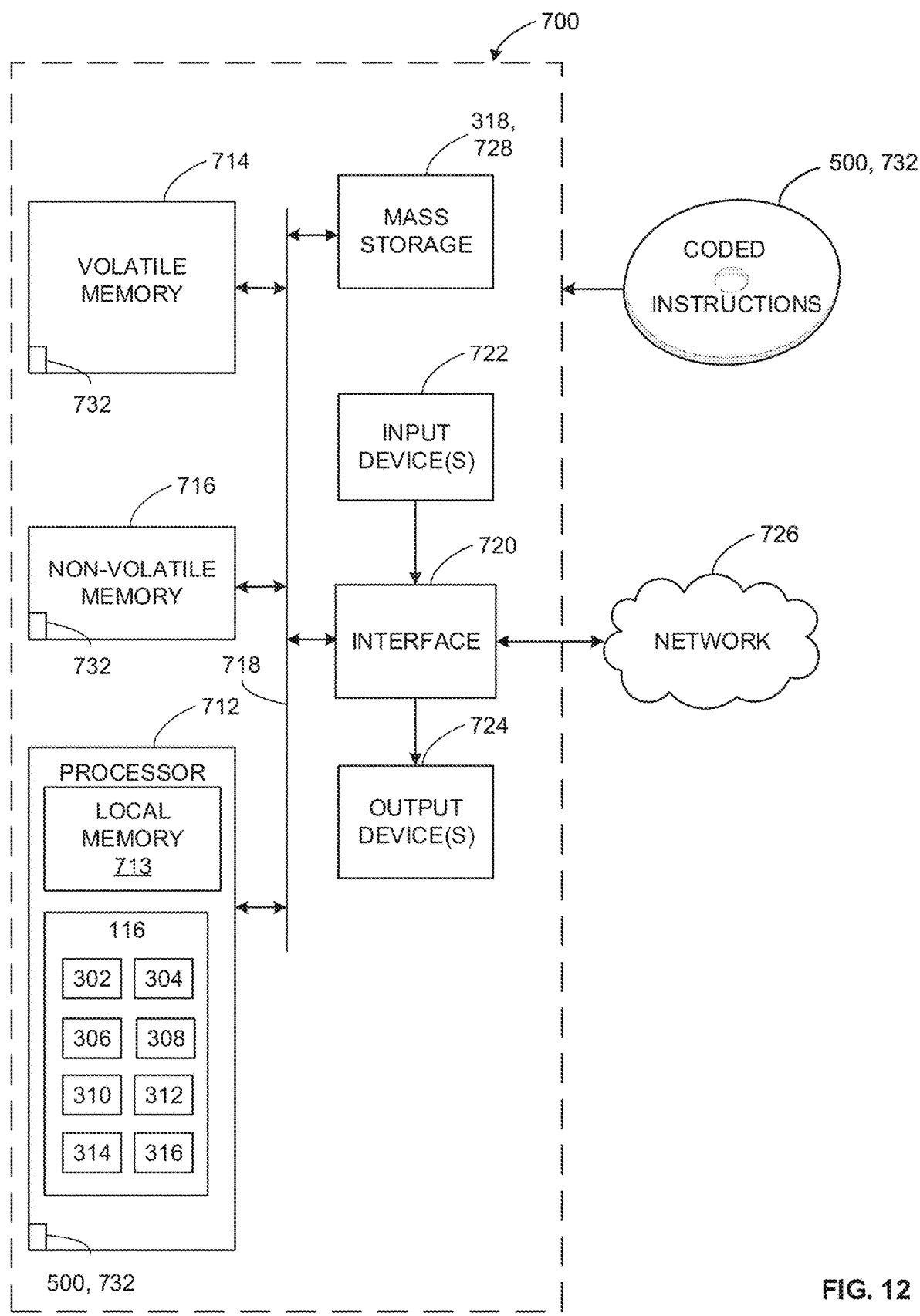
FIG. 12 is a block diagram of an example processing platform structured to execute the instructions of FIG. 10 to implement the example decoder of FIG. 8.

FIG. 12 is a block diagram of an example processor platform 700 structured to execute the instructions of FIG. 10 to implement the apparatus of FIG. 8. The processor platform 700 can be, for example, a server, a personal computer, a workstation, a self-learning machine (e.g., a neural network), a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the decoder 116, the receiver 302, the signal transformer 304, the component detector 306, the phase reference determiner 308, the timer 310, the phase comparator 312, the phase shift determiner 314, and the symbol determiner 316.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by SDRAM, DRAM, RDRAM® and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a USB, a Bluetooth® interface, an NFC interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 724 are also connected to the interface circuit 720 of the illustrated example. The output devices 624 can be implemented, for example, by display devices (e.g., am LED, an OLED, an LCD, a CRT display, an IPS display, a touchscreen, etc.), a tactile output device, a printer, and/or speaker. The interface circuit 720 of the illustrated example, thus, typically includes a graphics driver card, a graphics driver chip, and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a DSL connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and DVD drives.

The machine executable instructions 732 of FIG. 10 may be stored in the mass storage device 728, in the volatile memory 714, in the non-volatile memory 716, and/or on a removable non-transitory computer readable storage medium such as a CD or DVD.

From the foregoing, it will be appreciated that example apparatus, devices, systems, methods, and articles of manufacture have been disclosed that can be used to reduce the number of frequencies that are added to programming material and other media to include watermarks in such materials by using phase shifts of the same frequencies to inject unique symbols of the watermarks into the media. The reduced frequency additions improve the resulting quality of the watermarked media because less of the media has been modified or augmented. Reduction of the number of frequencies used in watermarking also decreases the coloring of the media signal with noise.

The teachings of this disclosure also use different frequencies, different amounts of frequencies, and different phase shifts amongst the frequencies to encode watermarks into media signals. Thus, there abundant combinations of frequencies and phase shifts that may be used to code watermark symbols. The large volume of combinations frequencies and phase shifts also results in the ability to use less frequencies.

In addition, the large volume of combinations of frequencies and phase shifts could produce very complex correlations between the signal characteristics (e.g., phase shifts and frequencies) and the coded numerical representations (e.g., hexadecimal numbers) of the watermark. Thus, these techniques make is more difficult to decrypt the watermarked media signal and to identify the unique watermark encoding that was inserted into the watermarked media signal, which enhances security.

An example watermark decoding apparatus is disclosed herein. The example watermark decoding apparatus includes a component detector to: identify watermark components in a media signal and detect phases of respective ones of the watermark components in the media signal; a phase reference determiner to identify a phase reference for the watermark components; a phase comparator to perform comparisons of the phases of the respective ones of the watermark components with the phase reference; a phase shift determiner to determine phase shifts associated with respective ones of the watermark components based on the comparisons; and a symbol determiner to determine a symbol based on the phase shifts.

In some examples, the symbol determiner is to determine the symbol by referencing a table correlating phase shifts with coded numerical representations.

In some examples, the coded numerical representations include hexadecimal numbers.

In some examples, the component detector is to detect an alignment symbol, and the phase reference determiner is to determine the phase reference based on the position of the alignment symbol.

In some examples, the phase reference is broadcast in the watermark after the alignment symbol.

In some examples, the watermark components include a first watermark component and a second watermark component, and the phase shift determiner is to determine a first phase shift of the first watermark component and a second phase shift of the second watermark component, the second phase shift different than the first phase shift.

In some examples, the second phase shift is 180 degrees different than the first phase shift.

In some examples, the watermark components include a first watermark component and a second watermark component, the component detector to detect a first frequency of the first watermark component and a second frequency of the second watermark component, the second frequency different than the first frequency, and the phase shift determiner to determine a first phase shift of the first watermark component and a second phase shift of the second watermark component, the second phase shift equal to the first phase shift.

In some examples, the phase reference is a first phase reference, the component detector to identify a first watermark and a second watermark, the phase reference determiner to identify the phase reference in the first watermark and to identify a second phase reference in the second watermark, the second phase reference different than the first phase reference.

In some examples, the symbol determiner is to determine the symbols of respective ones of the watermark components based on a pattern of the phase shifts.

An example watermark decoding apparatus is disclosed herein. The example watermark decoding apparatus includes means for detecting components, the detecting means to: identify watermark components in a media signal and detect phases of respective ones of the watermark components in the media signal; means for identifying a phase reference for the watermark components; means for comparing the phases of the respective ones of the watermark components with the phase reference; means for determining phase shifts associated with respective ones of the watermark components based on the comparisons; and means for determining a symbol based on the phase shifts.

In some examples, the means for determining a symbol is to determine the symbol by referencing a table correlating phase shifts with coded numerical representations.

In some examples, the detecting means is to detect an alignment symbol, and the means for identifying a phase reference is to identify the phase reference based on the position of the alignment symbol.

In some examples, the watermark components include a first watermark component and a second watermark component, and the means for determining a phase shift is to determine a first phase shift of the first watermark component and a second phase shift of the second watermark component, the second phase shift different than the first phase shift.

In some examples, the watermark components include a first watermark component and a second watermark component, the detecting means to detect a first frequency of the first watermark component and a second frequency of the second watermark component, the second frequency different than the first frequency, and the means for determining a phase shift to determine a first phase shift of the first watermark component and a second phase shift of the second watermark component, the second phase shift equal to the first phase shift.

In some examples, the phase reference is a first phase reference, the detecting means to identify a first watermark and a second watermark, the means for identifying a phase reference to identify the phase reference in the first watermark and to identify a second phase reference in the second watermark, the second phase reference different than the first phase reference.

In some examples, the means for determining a symbol is to determine the symbols of respective ones of the watermark components based on a pattern of the phase shifts.

Disclosed herein is an example non-transitory computer readable storage medium that includes computer readable instructions that, when executed, cause one or more processors to, at least: identify watermark components in a media signal; detect phases of respective ones of the watermark components in the media signal; identify a phase reference for the watermark components; perform comparisons of the phases of the respective ones of the watermark components with the phase reference; determine phase shifts associated with respective ones of the watermark components based on the comparisons; and determine a symbol based on the phase shifts.

In some examples, the instructions, when executed, cause the one or more processors to determine the symbol by referencing a table correlating phase shifts with coded numerical representations.

In some examples, the instructions, when executed, cause the one or more processors to: detect an alignment symbol; and determine the phase reference based on the position of the alignment symbol.

In some examples, the watermark components include a first watermark component and a second watermark component, and wherein the instructions, when executed, cause the one or more processors to determine a first phase shift of the first watermark component and a second phase shift of the second watermark component, the second phase shift different than the first phase shift.

In some examples, the watermark components include a first watermark component and a second watermark component, and wherein the instructions, when executed, cause the one or more processors to: detect a first frequency of the first watermark component and a second frequency of the second watermark component, the second frequency different than the first frequency; and determine a first phase shift of the first watermark component and a second phase shift of the second watermark component, the second phase shift equal to the first phase shift.

In some examples, the phase reference is a first phase reference, and wherein the instructions, when executed, cause the one or more processors to: identify a first watermark and a second watermark; identify the phase reference in the first watermark; and identify a second phase reference in the second watermark, the second phase reference different than the first phase reference.

In some examples, the instructions, when executed, cause the one or more processors to determine the symbols of respective ones of the watermark components based on a pattern of the phase shifts.

An example apparatus disclosed herein includes memory including machine readable instructions and processor circuitry to execute the instructions to: identify watermark components in a media signal; detect phases of respective ones of the watermark components in the media signal; identify a phase reference for the watermark components; perform comparisons of the phases of the respective ones of the watermark components with the phase reference; determine phase shifts associated with respective ones of the watermark components based on the comparisons; and determine a symbol based on the phase shifts.

In some examples, the processor circuitry is to execute the instructions to determine the symbol by referencing a table correlating phase shifts with coded numerical representations.

In some examples, the processor circuitry is to execute the instructions to detect an alignment symbol and determine the phase reference based on the position of the alignment symbol.

In some examples, the watermark components include a first watermark component and a second watermark component, and wherein the processor circuitry is to execute the instructions to determine a first phase shift of the first watermark component and a second phase shift of the second watermark component, the second phase shift different than the first phase shift.

In some examples, the watermark components include a first watermark component and a second watermark component, and wherein the processor circuitry is to: detect a first frequency of the first watermark component and a second frequency of the second watermark component, the second frequency different than the first frequency; and determine a first phase shift of the first watermark component and a second phase shift of the second watermark component, the second phase shift equal to the first phase shift.

In some examples, the phase reference is a first phase reference, and wherein the processor circuitry is to execute the instructions to: identify a first watermark and a second watermark; identify the phase reference in the first watermark; and identify a second phase reference in the second watermark, the second phase reference different than the first phase reference.

In some examples, the processor circuitry is to execute the instructions to determine the symbols of respective ones of the watermark components based on a pattern of the phase shifts.

An example method to decode a watermark from a media signal is disclosed. The method includes: identifying, by executing an instruction with a processor, watermark components in the media signal; detecting, by executing an instruction with the processor, phases of respective ones of the watermark components in the media signal; identifying, by executing an instruction with the processor, a phase reference for the watermark components; performing, by executing an instruction with the processor, comparisons of the phases of the respective ones of the watermark components with the phase reference; determining, by executing an instruction with the processor, phase shifts associated with respective ones of the watermark components based on the comparisons; and determining, by executing an instruction with the processor, a symbol of based on the phase shifts.

In some examples, the method also includes referencing a table correlating phase shifts with coded numerical representations to determine the symbol.

In some examples, the method also includes: detecting, by executing an instruction with the processor, an alignment symbol; and determining, by executing an instruction with the processor, the phase reference based on the position of the alignment symbol.

In some examples, the watermark components include a first watermark component and a second watermark component, and the method includes determining, by executing an instruction with the processor, a first phase shift of the first watermark component and a second phase shift of the second watermark component, the second phase shift different than the first phase shift.

In some examples, the watermark components include a first watermark component and a second watermark component, and the method includes: detecting, by executing an instruction with the processor, a first frequency of the first watermark component and a second frequency of the second watermark component, the second frequency different than the first frequency; and determining, by executing an instruction with the processor, a first phase shift of the first watermark component and a second phase shift of the second watermark component, the second phase shift equal to the first phase shift.

In some examples, the phase reference is a first phase reference, and the method includes: identifying, by executing an instruction with the processor, a first watermark and a second watermark; identifying, by executing an instruction with the processor, the phase reference in the first watermark; and identifying, by executing an instruction with the processor, a second phase reference in the second watermark, the second phase reference different than the first phase reference.

In some examples, the method includes determining, by executing an instruction with the processor, the symbols of respective ones of the watermark components based on a pattern of the phase shifts.

An example watermark encoding apparatus is disclosed. The watermark encoding apparatus includes: a frequency selector to select a plurality of frequencies for encoding a watermark symbol; a phase reference selector to select a phase reference; a phase shift selector to select a phase shift pattern across the plurality of frequencies, the phase shift pattern relative to the phase reference; a mapper to correlate the phase shift pattern to a value of the watermark symbol; a media signal accessor to access a media signal; and a component generator to: embed the plurality of frequencies according to the phase shift pattern to encode the watermark symbol into the media signal; and embed the phase reference into the media signal.

In some examples, the component generator is to embed an alignment symbol into the media signal and to embed the phase reference to follow the alignment symbol.

In some examples, the component generator is to embed an error checking alignment symbol into the media signal and to embed the phase reference to follow the error checking alignment symbol.

In some examples, the media signal a first media signal and the phase reference is a first phase reference, the phase reference selector to select a second phase reference, the second phase reference different than the first phase reference, and the component generator to embed the second phase reference in the second media signal.

In some examples, the phase shift pattern includes a first phase shift for a first of the frequencies and a second phase shift for a second of the frequencies, the first phase shift and the second phase shift being equal.

In some examples, the phase shift pattern includes a first phase shift for a first of the frequencies and a second phase shift for a second of the frequencies, the second phase shift different than the first phase shift.

In some examples, the watermark symbol occupies a time slot in the media signal, the component generator to embed the watermark symbol in a half of the time slot.

In some examples, the phase shift is a first phase shift, the phase shift selector is to select a second phase shift for an offset of the watermark symbol, the second phase shift 180 degrees different than the first phase shift.

In some examples, the watermark symbol occupies a time slot in the media signal, the component generator is to embed at least one of: the watermark symbol in a first half of the time slot or the offset of the watermark symbol in a second half of the time slot.

An example watermark encoding apparatus is disclosed. The watermark encoding apparatus includes: means for selecting a plurality of frequencies for encoding a watermark symbol; means for selecting a phase reference; means for selecting a phase shift pattern across the plurality of frequencies, the phase shift pattern relative to the phase reference; means for correlating the phase shift pattern to a value of the watermark symbol; means for accessing a media signal; and means for generating a watermark component, the generating means to: embed the plurality of frequencies according to the phase shift pattern to encode the watermark symbol into the media signal; and embed the phase reference into the media signal.

In some examples, the watermark code is a hexadecimal number.

In some examples, the generator means is to embed an alignment symbol into the media signal and to embed the phase reference to follow the alignment symbol.

In some examples, the generating means is to embed an error checking alignment symbol into the media signal and to embed the phase reference to follow the error checking alignment symbol.

In some examples, the media signal a first media signal and the phase reference is a first phase reference, the means for selecting a phase reference is to select a second phase reference, the second phase reference different than the first phase reference, and the generating means to embed the second phase reference in the second media signal.

In some examples, the watermark symbol occupies a time slot in the media signal, the generating means to embed the watermark symbol in a half of the time slot.

In some examples, the phase shift is a first phase shift, the means for selecting a phase shift is to select a second phase shift for an offset of the watermark symbol, the second phase shift 180 degrees different than the first phase shift.

In some examples, the watermark symbol occupies a time slot in the media signal, the generating means to embed at least one of: the watermark symbol in a first half of the time slot or the offset of the watermark symbol in a second half of the time slot.

Disclosed herein is an example non-transitory computer readable storage medium that includes computer readable instructions that, when executed, cause one or more processors to, at least: select a plurality of frequencies for encoding a watermark symbol; select a phase reference; select a phase shift pattern across the plurality of frequencies, the phase shift pattern relative to the phase reference; correlate the phase shift pattern to a value of the watermark symbol; embed the plurality of frequencies according to the phase shift pattern to encode the watermark symbol into a media signal; and embed the phase reference into the media signal.

In some examples, the instructions, when executed, cause the one or more processors to: embed an alignment symbol into the media signal; and embed the phase reference to follow the alignment symbol.

In some examples, the instructions, when executed, cause the one or more processors to: embed an error checking alignment symbol into the media signal; and embed the phase reference to follow the error checking alignment symbol.

In some examples, the media signal a first media signal and the phase reference is a first phase reference, and the instructions, when executed, cause the one or more processors to: select a second phase reference, the second phase reference different than the first phase reference; and embed the second phase reference in the second media signal.

In some examples, the watermark symbol occupies a time slot in the media signal, and the instructions, when executed, cause the one or more processors to embed the watermark symbol in a half of the time slot.

In some examples, the phase shift is a first phase shift, and the instructions, when executed, cause the one or more processors to select a second phase shift for an offset of the watermark symbol, the second phase shift 180 degrees different than the first phase shift.

In some examples, the watermark symbol occupies a time slot in the media signal, and the instructions, when executed, cause the one or more processors to embed at least one of: the watermark symbol in a first half of the time slot or the offset of the watermark symbol in a second half of the time slot.

An example apparatus is disclosed that includes memory including machine readable instructions and processor circuitry to execute the instructions to: select a plurality of frequencies for encoding a watermark symbol; select a phase reference; select a phase shift pattern across the plurality of frequencies, the phase shift pattern relative to the phase reference; correlate the phase shift pattern to a value of the watermark symbol; embed the plurality of frequencies according to the phase shift pattern to encode the watermark symbol into a media signal; and embed the phase reference into the media signal.

In some examples, the processor circuitry is to execute the instructions to embed an alignment symbol into the media signal and embed the phase reference to follow the alignment symbol.

In some examples, the processor circuitry is to execute the instructions to embed an error checking alignment symbol into the media signal and embed the phase reference to follow the error checking alignment symbol.

In some examples, the media signal a first media signal and the phase reference is a first phase reference, and the processor circuitry is to execute the instructions to: select a second phase reference, the second phase reference different than the first phase reference; and embed the second phase reference in the second media signal.

In some examples, the watermark symbol occupies a time slot in the media signal, and the processor circuitry is to execute the instructions to embed the watermark symbol in a half of the time slot.

In some examples, the phase shift is a first phase shift, and the processor circuitry is to execute the instructions to select a second phase shift for an offset of the watermark symbol, the second phase shift 180 degrees different than the first phase shift.

In some examples, the watermark symbol occupies a time slot in the media signal, and the processor circuitry is to execute the instructions to embed at least one of: the watermark symbol in a first half of the time slot or the offset of the watermark symbol in a second half of the time slot.

An example method to encode a watermark into a media signal is disclosed. The method includes: selecting, by executing an instruction with a processor, a plurality of frequencies for encoding a watermark symbol; selecting, by executing an instruction with a processor, a phase reference; selecting, by executing an instruction with a processor, a phase shift pattern across the plurality of frequencies, the phase shift pattern relative to the phase reference; correlating, by executing an instruction with a processor, the phase shift pattern to a value of the watermark symbol; embedding, by executing an instruction with a processor, the plurality of frequencies according to the phase shift pattern to encode the watermark symbol into a media signal; and embedding, by executing an instruction with a processor, the phase reference into the media signal.

In some examples, the method further includes: embedding, by executing an instruction with a processor, an alignment symbol into the media signal; and embedding, by executing an instruction with a processor, the phase reference to follow the alignment symbol.

In some examples, the method further includes: embedding, by executing an instruction with a processor, an error checking alignment symbol into the media signal; and embedding, by executing an instruction with a processor, the phase reference to follow the error checking alignment symbol.

In some examples, the media signal a first media signal and the phase reference is a first phase reference, and the method further includes: selecting, by executing an instruction with a processor, a second phase reference, the second phase reference different than the first phase reference; and embedding, by executing an instruction with a processor, the second phase reference in the second media signal.

In some examples, the watermark symbol occupies a time slot in the media signal, and the method includes embedding, by executing an instruction with a processor, the watermark symbol in a half of the time slot.

In some examples, the phase shift is a first phase shift, and the method includes selecting, by executing an instruction with a processor, a second phase shift for an offset of the watermark symbol, the second phase shift 180 degrees different than the first phase shift.

In some examples, the watermark symbol occupies a time slot in the media signal, and the method includes embedding, by executing an instruction with a processor, at least one of: the watermark symbol in a first half of the time slot or the offset of the watermark symbol in a second half of the time slot.

Although certain example methods, apparatus and articles of manufacture have been disclosed herein, the scope of coverage of this patent is not limited thereto. On the contrary, this patent covers all apparatus, devices, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A watermark decoding apparatus comprising:
   a component detector to:
      identify watermark components in a media signal; and
      detect phases of respective ones of the watermark components in the media signal;
   a phase reference determiner to identify a phase reference for the watermark components;
   a phase comparator to perform comparisons of the phases of the respective ones of the watermark components with the phase reference;
   a phase shift determiner to determine phase shifts associated with respective ones of the watermark components based on the comparisons; and
   a symbol determiner to determine a symbol based on the phase shifts.

2. The watermark decoding apparatus as defined in claim 1, wherein the symbol determiner is to determine the symbol by referencing a table correlating phase shifts with coded numerical representations.

3. The watermark decoding apparatus as defined in claim 2, wherein the coded numerical representations include hexadecimal numbers.

4. The watermark decoding apparatus as defined in claim 1, wherein the component detector is to detect an alignment symbol, and the phase reference determiner is to determine the phase reference based on the position of the alignment symbol.

5. The watermark decoding apparatus as defined in claim 4, wherein the phase reference is broadcast in the watermark after the alignment symbol.

6. The watermark decoding apparatus as defined in claim 1, wherein the watermark components include a first watermark component and a second watermark component, and the phase shift determiner is to determine a first phase shift of the first watermark component and a second phase shift of the second watermark component, the second phase shift different than the first phase shift.

7. The watermark decoding apparatus as defined in claim 6, wherein the second phase shift is 180 degrees different than the first phase shift.

8. The watermark decoding apparatus as defined in claim 1, wherein the watermark components include a first watermark component and a second watermark component,
the component detector to detect a first frequency of the first watermark component and a second frequency of the second watermark component, the second frequency different than the first frequency, and
the phase shift determiner to determine a first phase shift of the first watermark component and a second phase shift of the second watermark component, the second phase shift equal to the first phase shift.

9. The watermark decoding apparatus as defined in claim 1, wherein the phase reference is a first phase reference,
the component detector to identify a first watermark and a second watermark,
the phase reference determiner to identify the phase reference in the first watermark and to identify a second phase reference in the second watermark, the second phase reference different than the first phase reference.

10. The watermark decoding apparatus as defined in claim 1, wherein the symbol determiner is to determine the symbols of respective ones of the watermark components based on a pattern of the phase shifts.

11. A non-transitory computer readable storage medium comprising computer readable instructions that, when executed, cause one or more processors to, at least:
identify watermark components in a media signal;
detect phases of respective ones of the watermark components in the media signal;
identify a phase reference for the watermark components;
perform comparisons of the phases of the respective ones of the watermark components with the phase reference;
determine phase shifts associated with respective ones of the watermark components based on the comparisons; and
determine a symbol based on the phase shifts.

12. The storage medium as defined in claim 11, wherein the instructions, when executed, cause the one or more processors to determine the symbol by referencing a table correlating phase shifts with coded numerical representations.

13. The storage medium as defined in claim 12, wherein the coded numerical representations include hexadecimal numbers.

14. The storage medium as defined in claim 11, wherein the instructions, when executed, cause the one or more processors to:
detect an alignment symbol; and
determine the phase reference based on the position of the alignment symbol.

15. The storage medium as defined in claim 14, wherein the phase reference is broadcast in the watermark after the alignment symbol.

16. The storage medium as defined in claim 11, wherein the watermark components include a first watermark component and a second watermark component, and wherein the instructions, when executed, cause the one or more processors to determine a first phase shift of the first watermark component and a second phase shift of the second watermark component, the second phase shift different than the first phase shift.

17. The storage medium as defined in claim 16, wherein the second phase shift is 180 degrees different than the first phase shift.

18. The storage medium as defined in claim 11, wherein the watermark components include a first watermark component and a second watermark component, and wherein the instructions, when executed, cause the one or more processors to:
detect a first frequency of the first watermark component and a second frequency of the second watermark component, the second frequency different than the first frequency; and
determine a first phase shift of the first watermark component and a second phase shift of the second watermark component, the second phase shift equal to the first phase shift.

19. The storage medium as defined in claim 11, wherein the phase reference is a first phase reference, and wherein the instructions, when executed, cause the one or more processors to:
identify a first watermark and a second watermark;
identify the phase reference in the first watermark; and
identify a second phase reference in the second watermark, the second phase reference different than the first phase reference.

20. The storage medium as defined in claim 11, wherein the instructions, when executed, cause the one or more processors to determine the symbols of respective ones of the watermark components based on a pattern of the phase shifts.

* * * * *